US012693397B1

(12) United States Patent
Hawk

(10) Patent No.: US 12,693,397 B1
(45) Date of Patent: Jul. 28, 2026

(54) STEREOPHONIC AND N-PHONIC ENERGY DETECTOR

(71) Applicant: Nathaniel Hawk, Akron, OH (US)

(72) Inventor: Nathaniel Hawk, Akron, OH (US)

( * ) Notice: Subject to any disclaimer, the term of this patent is extended or adjusted under 35 U.S.C. 154(b) by 560 days.

(21) Appl. No.: 18/084,988

(22) Filed: Dec. 20, 2022

Related U.S. Application Data

(63) Continuation of application No. 16/810,141, filed on Mar. 5, 2020, now Pat. No. 11,564,027.

(60) Provisional application No. 62/814,485, filed on Mar. 6, 2019.

(51) Int. Cl.
| | |
|---|---|
| *G01S 13/04* | (2006.01) |
| *G08B 13/24* | (2006.01) |
| *G10L 25/51* | (2013.01) |
| *H01Q 21/20* | (2006.01) |
| *H04R 1/10* | (2026.01) |
| *H04R 3/04* | (2006.01) |

(52) U.S. Cl.
CPC .......... *G01S 13/04* (2013.01); *G08B 13/2491* (2013.01); *G10L 25/51* (2013.01); *H01Q 21/205* (2013.01); *G08B 13/2402* (2013.01); *G08B 13/2494* (2013.01); *H04R 1/1008* (2013.01); *H04R 1/1041* (2013.01); *H04R 3/04* (2013.01)

(58) Field of Classification Search
CPC . G01S 13/04; G08B 13/2491; G08B 13/2402; G08B 13/2494; G10L 25/51; H01Q 21/205; H04R 1/1008; H04R 1/1041; H04R 3/04
See application file for complete search history.

(56) References Cited

U.S. PATENT DOCUMENTS

| | | | |
|---|---|---|---|
| 3,076,191 | A | 1/1963 | Williams |
| 5,677,561 | A | 10/1997 | Jensen |
| 6,011,754 | A | 1/2000 | Burgess et al. |
| 6,038,330 | A | 3/2000 | Meucci |
| 6,933,900 | B2 | 8/2005 | Kitamori et al. |
| 6,961,025 | B1 | 11/2005 | Chethik |
| 7,123,876 | B2 | 10/2006 | Wang et al. |
| 10,353,982 | B1 * | 7/2019 | Kumar ................. G06Q 10/087 |
| 2004/0108963 | A1 | 6/2004 | Clymer et al. |
| 2005/0266875 | A1 | 12/2005 | Yegin et al. |
| 2006/0033661 | A1 | 2/2006 | Swope et al. |
| 2007/0004357 | A1 | 1/2007 | Ojo et al. |
| 2009/0184881 | A1 | 7/2009 | Bullock et al. |

(Continued)

FOREIGN PATENT DOCUMENTS

| | | | | |
|---|---|---|---|---|
| WO | WO-2015136328 A1 * | 9/2015 | ........... | G01S 13/931 |

OTHER PUBLICATIONS

Yan et al., "Dual-Band Textile MIMO Antenna Based on Substrate-Integrated Waveguide (SIW) Technology", Nov. 2015, IEEE Transactions on Antennas and Propagation, vol. 63, No. 11, pp. 4640-4647. (Year: 2015).*

*Primary Examiner* — Daniel R Sellers

(74) *Attorney, Agent, or Firm* — Burris Law, PLLC

(57) ABSTRACT

An n-phonic energy detection ("NED") system includes two antenna structures separated by a distance. Each of the two antenna structures includes antenna elements. The NED system also includes radio frequency ("RF") detectors configured to detect RF energy emitted from a source and received by the two antenna structures, and an amplifier that amplifies signals from the RF detectors and outputs the amplified signals to a computer.

18 Claims, 20 Drawing Sheets

(56)          References Cited

U.S. PATENT DOCUMENTS

| | | | |
|---|---|---|---|
| 2010/0119002 A1* | 5/2010 | Hartenstein | H01Q 21/24 |
| | | | 375/267 |
| 2013/0181867 A1* | 7/2013 | Sturdivant | G06Q 30/0241 |
| | | | 342/368 |
| 2015/0123770 A1* | 5/2015 | Jones | G01S 1/68 |
| | | | 340/10.1 |
| 2015/0181388 A1 | 6/2015 | Smith | |
| 2015/0219757 A1* | 8/2015 | Boelter | G01S 13/68 |
| | | | 701/519 |
| 2017/0149130 A1* | 5/2017 | Kim | H01Q 21/0056 |
| 2017/0324171 A1* | 11/2017 | Shehan | H01Q 5/30 |
| 2017/0344773 A1* | 11/2017 | Lauria | H04L 47/24 |
| 2018/0062239 A1 | 3/2018 | McCoy | |
| 2020/0293851 A1* | 9/2020 | Bakke | H04W 4/90 |

* cited by examiner

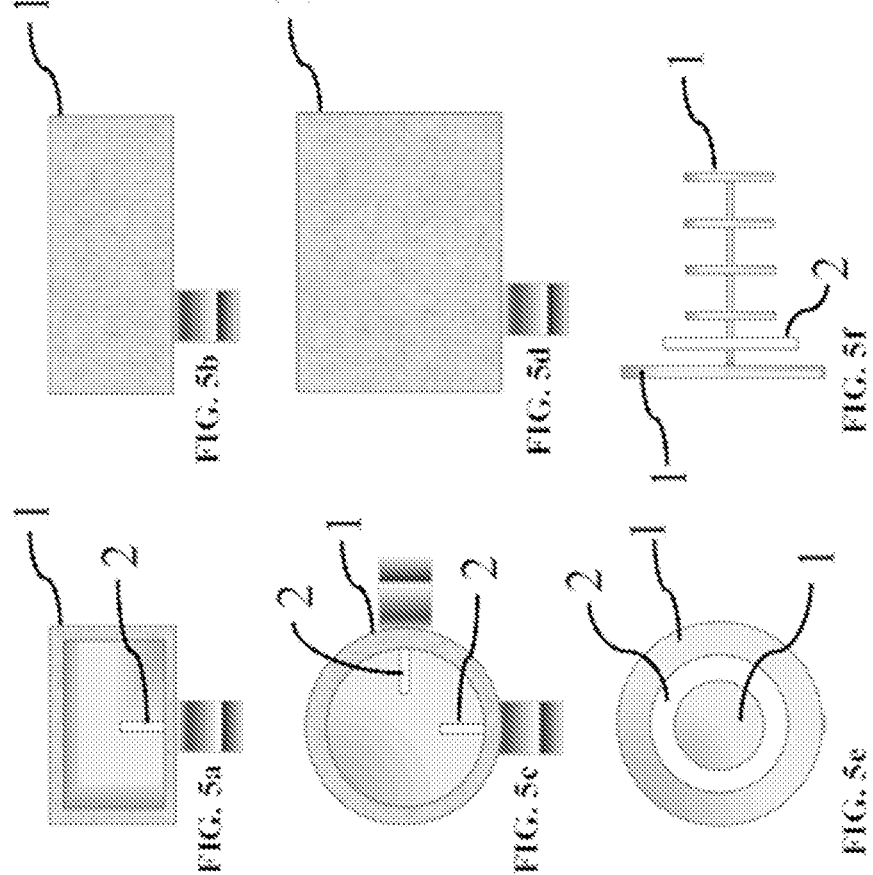

500

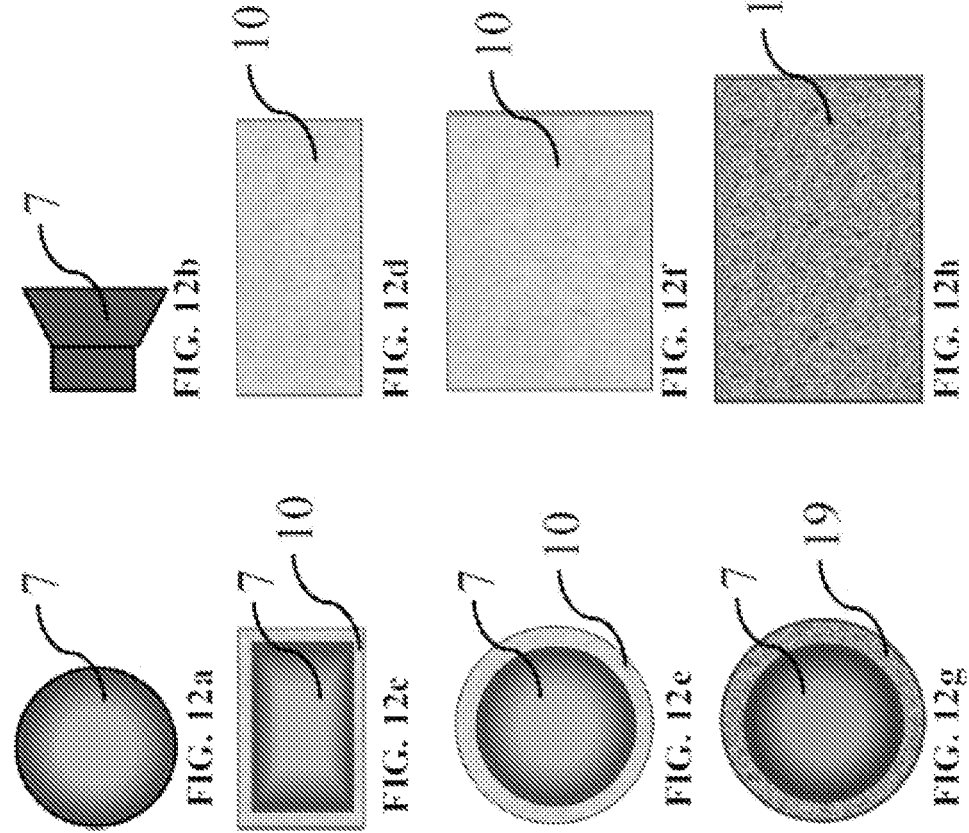

1100

STEREOPHONIC AND N-PHONIC ENERGY DETECTOR

CROSS-REFERENCE TO RELATED APPLICATIONS

This application is a continuation of U.S. patent application Ser. No. 16/810,141, filed Mar. 5, 2020, which claims the benefit of U.S. Provisional Patent Application Ser. No. 62/814,485 entitled "STEREOPHONIC AND N-PHONIC ENERGY DETECTOR" which was filed Mar. 6, 2019. The entirety of the aforementioned applications is herein incorporated by reference.

FIELD OF INVENTION

The following description relates generally to devices enabling radio frequency (RF) energy localization, and more specifically to a stereophonic energy detector and an n-phonic energy detector.

BACKGROUND OF INVENTION

Commonly used devices, such as radios, cordless and cellular telephones, garage door openers, wireless networks, radars, and microwave ovens, for example, emit electromagnetic (EM) energy. All of these devices are in three-dimensional space and interact electromagnetically with one another. Three-dimensional spatial awareness of energy from these devices reveals desirable and undesirable EM effects.

SUMMARY

The following presents a simplified summary of the invention in order to provide a basic understanding of some example aspects of the invention. This summary is not an extensive overview of the invention. Moreover, this summary is not intended to identify critical elements of the invention or to delineate the scope of the invention. The sole purpose of the summary is to present some concepts in a simplified form as a prelude to the more detailed description that is presented later.

In one general aspect, an n-phonic energy detection ("NED") system can include two antenna structures separated by a distance, each of the two antenna structures being configured to be placed adjacent one of a pair of human ears, and each including a plurality of antenna elements; a plurality of speakers, each configured to be placed adjacent one of the pair of human ears; at least two radio frequency ("RF") detectors configured to detect RF energy that is emitted from a source and received by each of the two antenna structures; and an amplifier configured to amplify signals from the at least two RF detectors and output the amplified signals to a computer and to each of the plurality of speakers corresponding to the antenna structure configured to be placed adjacent a same one of the pair of human ears.

In the NED system according to the foregoing aspect, each of the plurality of speakers can be arranged within one of the two antenna structures, respectively.

In the NED system according to the foregoing aspect, each of the plurality of speakers can be arranged within each of the plurality of antenna elements.

In the NED system according to the foregoing aspect, each of the plurality of antenna elements can be a directional antenna arranged on an outer surface of a half-sphere support structure.

In the NED system according to the foregoing aspect, each of the plurality of antenna elements can be a directional waveguide antenna.

In the NED system according to the foregoing aspect, each of the two antenna structures can include an array of antenna elements arranged in close proximity relative to each other.

In the NED system according to the foregoing aspect, the array of antenna elements can form a sphere.

In the NED system according to the foregoing aspect, the array of antenna elements can be arranged on an outer surface of the sphere.

In the NED system according to the foregoing aspect, the speakers can be arranged on an inner surface of the sphere and can be spatially fixed relative to one of the pair of human ears.

In the NED system according to the foregoing aspect, the speakers can be arranged in locations that are complementary to the locations of each antenna element of the array of antenna elements.

The NED system according to the foregoing aspect can further include a sound absorbing material applied on the innermost surface between at least two speakers of the plurality of speakers.

The NED system according to the foregoing aspect can further include an RF absorbing material applied on the outermost surface between at least two antenna elements of the plurality of antenna elements.

In the NED system according to the foregoing aspect, the directional antennas can be shaped as a cavity made of an RF absorbing material.

In the NED system according to the foregoing aspect, computer generated visual signals can be fed to a display system.

In the NED system according to the foregoing aspect, computer generated audio signals can be fed to each of the plurality of speakers.

In another general aspect, an n-phonic energy detection ("NED") system can include two antenna structures separated by a distance, each of the two antenna structures including a plurality of antenna elements; at least two radio frequency ("RF") detectors configured to detect RF energy that is emitted from a source and received by each of the two antenna structures; and an amplifier configured to amplify signals from the at least two RF detectors and output the amplified signals to a computer.

In the NED system according to the foregoing aspect, each of the plurality of antenna elements can be a directional antenna arranged on an outer surface of a half-sphere support structure.

In the NED system according to the foregoing aspect, each of the plurality of antenna elements can be a directional waveguide antenna.

In the NED system according to the foregoing aspect, each of the two antenna structures can include an array of antenna elements arranged in close proximity relative to each other.

In the NED system according to the foregoing aspect, the array of antenna elements can form a sphere.

In the NED system according to the foregoing aspect, the array of antenna elements can be arranged on an outer surface of the sphere.

The NED system according to the foregoing aspect can further include an RF absorbing material applied on the outermost surface between at least two antenna elements of the plurality of antenna elements.

In the NED system according to the foregoing aspect, the directional antennas can be shaped as a cavity made of an RF absorbing material.

In the NED system according to the foregoing aspect, computer generated visual signals can be fed to a display system.

BRIEF DESCRIPTION OF THE DRAWINGS

The foregoing and other aspects of the present disclosure will become apparent to those skilled in the art to which the present disclosure relates upon reading the following description with reference to the accompanying drawings, in which:

FIG. 5a is a front view of a rectangular linearly polarized directional antenna;

FIG. 5b is a side view of the rectangular linearly polarized directional antenna shown in FIG. 5a;

FIG. 5c is a front view of a circular directional antenna, which accepts both horizontally and vertically linearly polarized signals;

FIG. 5d illustrates a side view of the circular directional antenna shown in FIG. 5c;

FIG. 5e is a front view of a circular Yagi antenna;

FIG. 5f is a side view of the circular Yagi antenna shown in FIG. 5e;

FIG. 6a illustrates an antenna positioned next to an RF absorbing material;

FIG. 6b is a side view of the antenna shown in FIG. 6a;

FIG. 6c illustrates antennas positioned in a cavity made of an RF absorbing material (both horizontally and vertically linearly polarized);

FIG. 6d is a side view of the RF absorbing material cavity shown in FIG. 6c;

FIG. 7a illustrates a square waveguide-based NED tuned for 5.8 GHz (front view);

FIG. 7b is a back view of the square waveguide-based NED shown in FIG. 7a;

FIG. 7c is a top view of the square waveguide-based NED shown in FIG. 7a;

FIG. 8a is a front perspective view of a wearable rectangular waveguide-based NED tuned for 5.8 GHz;

FIG. 8b is a side view highlighting the rectangular waveguide antennas of the wearable rectangular waveguide-based NED shown in FIG. 8a;

FIG. 8c is a view of the inner acoustical waveguides of the rectangular waveguide-based NED shown in FIG. 8a;

FIG. 8d is a view of the rectangular waveguide-based NED shown in FIG. 8a with the inner acoustical waveguides removed, showing the speakers;

FIG. 8e is a back view of a wearable rectangular waveguide-based NED shown in FIG. 8a;

4

Figures 9A, 9B, 9C:
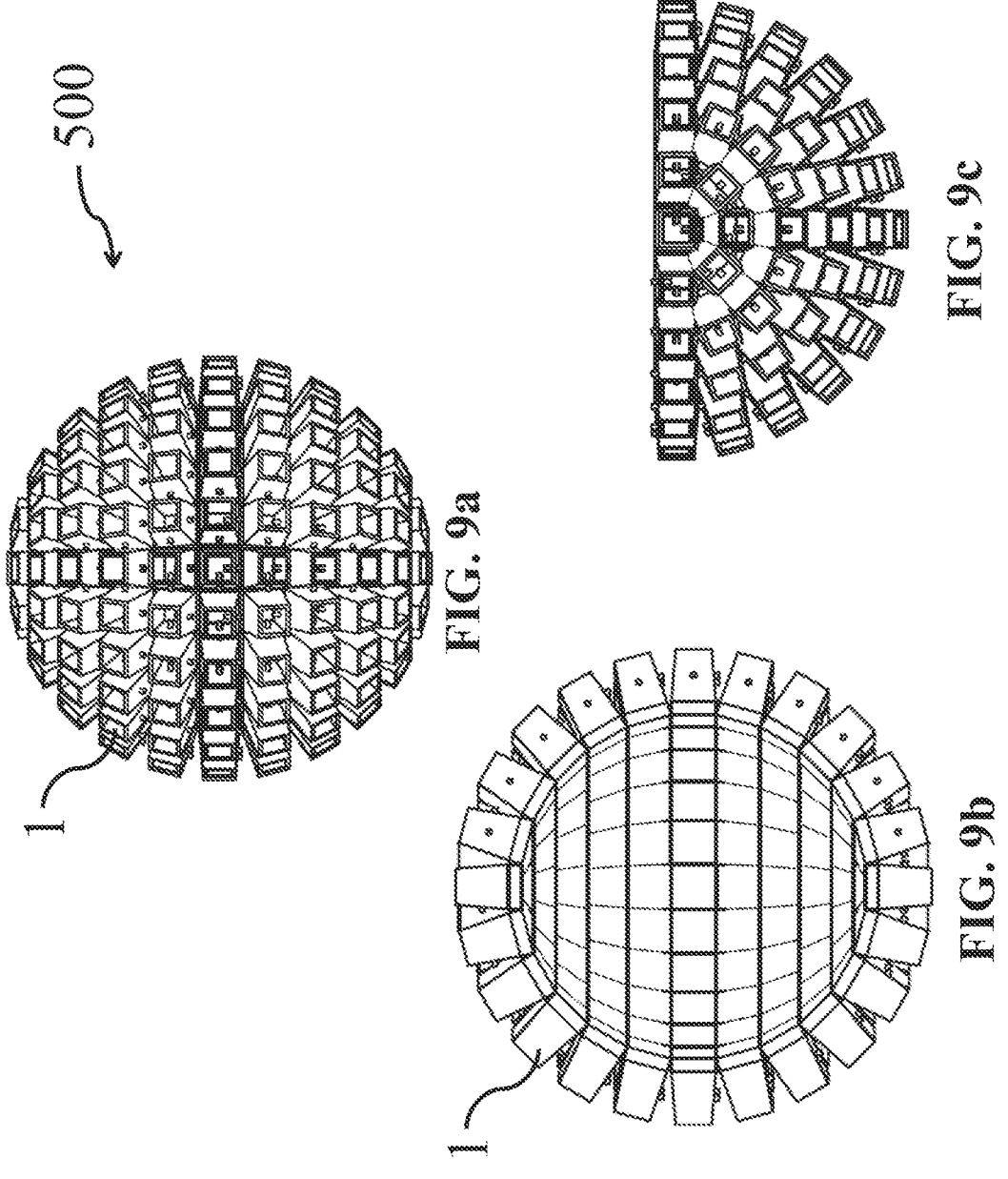
Figures 10A, 10B, 10C:
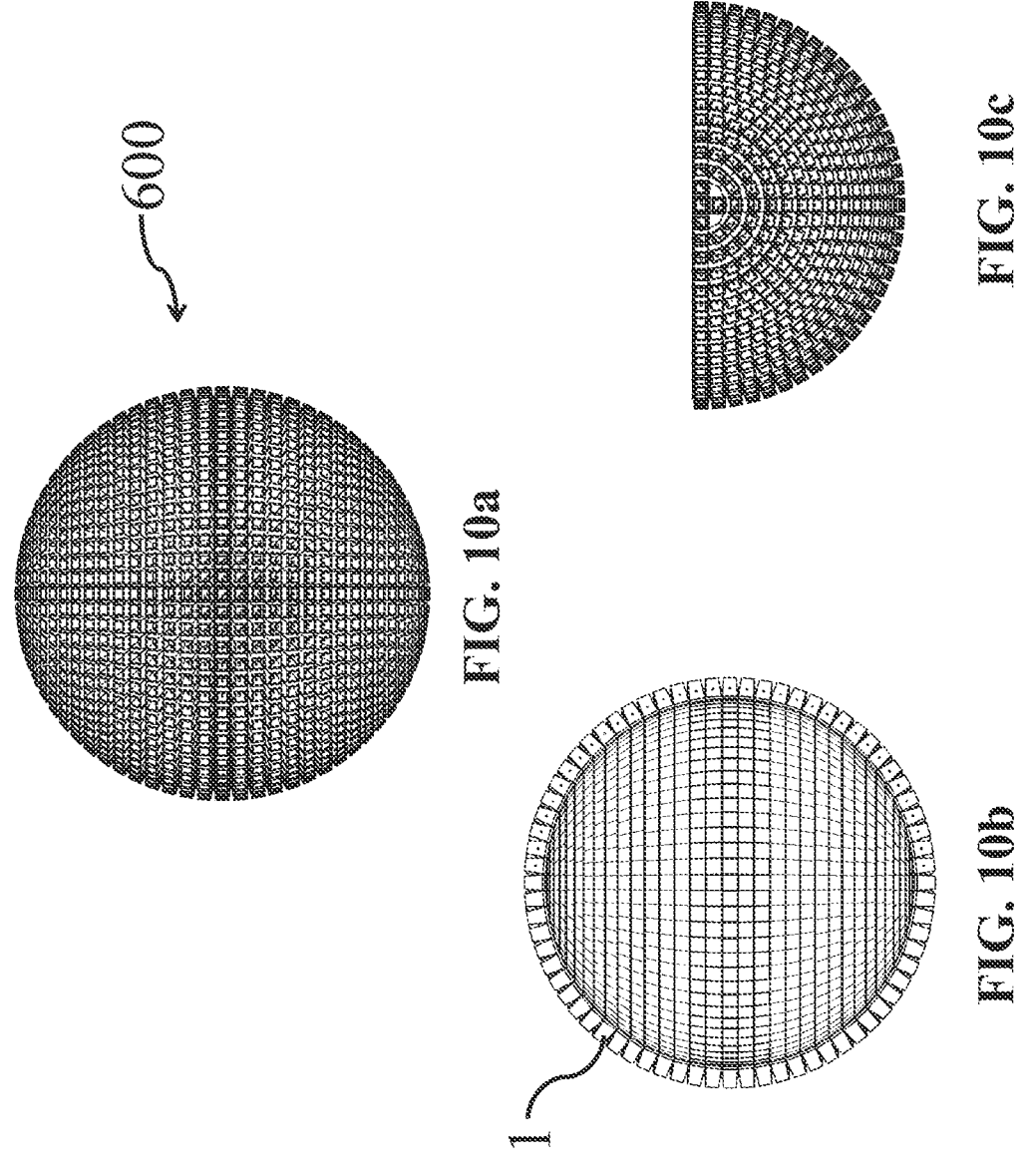
Figures 11A, 11B, 11C:
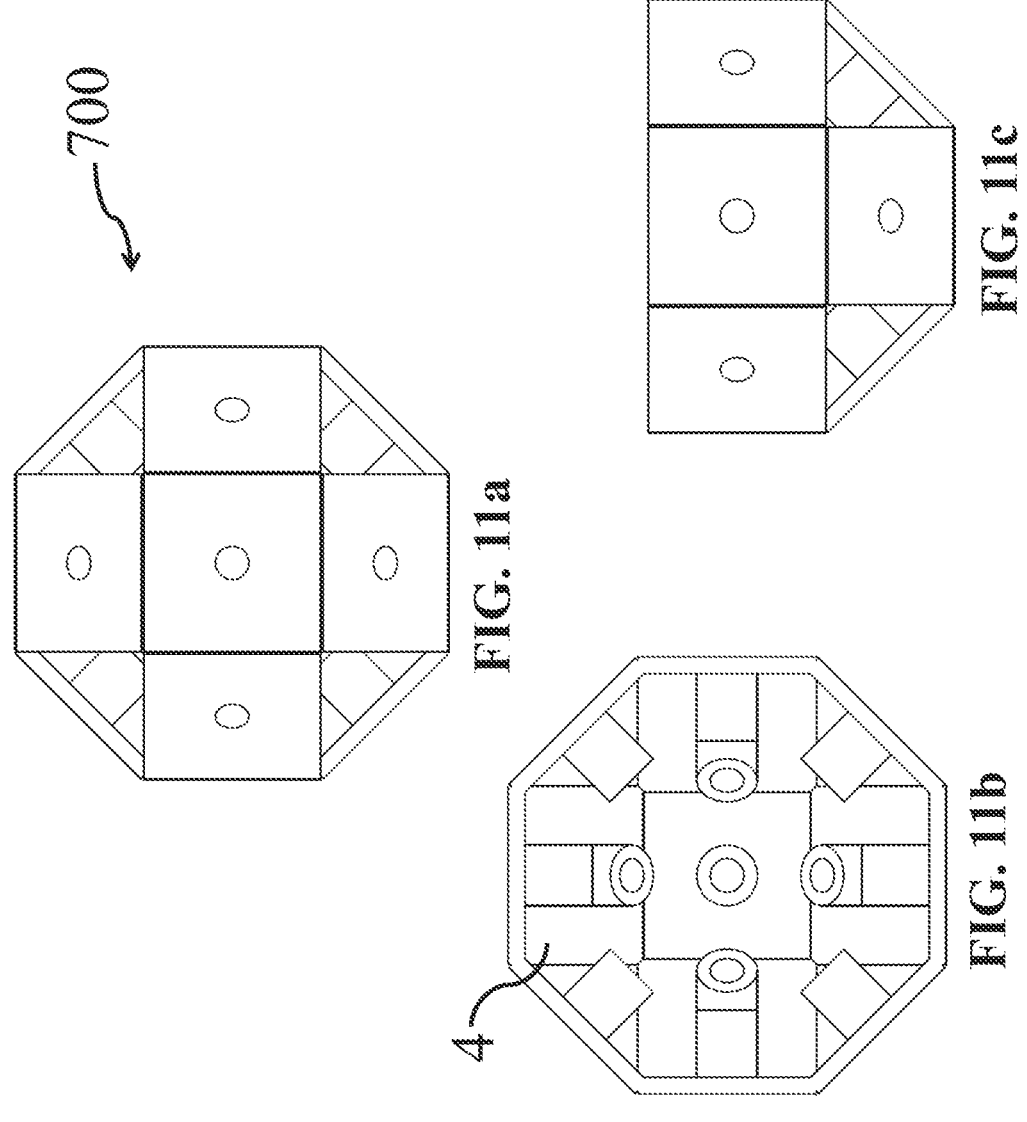
Figures 13A, 13B:
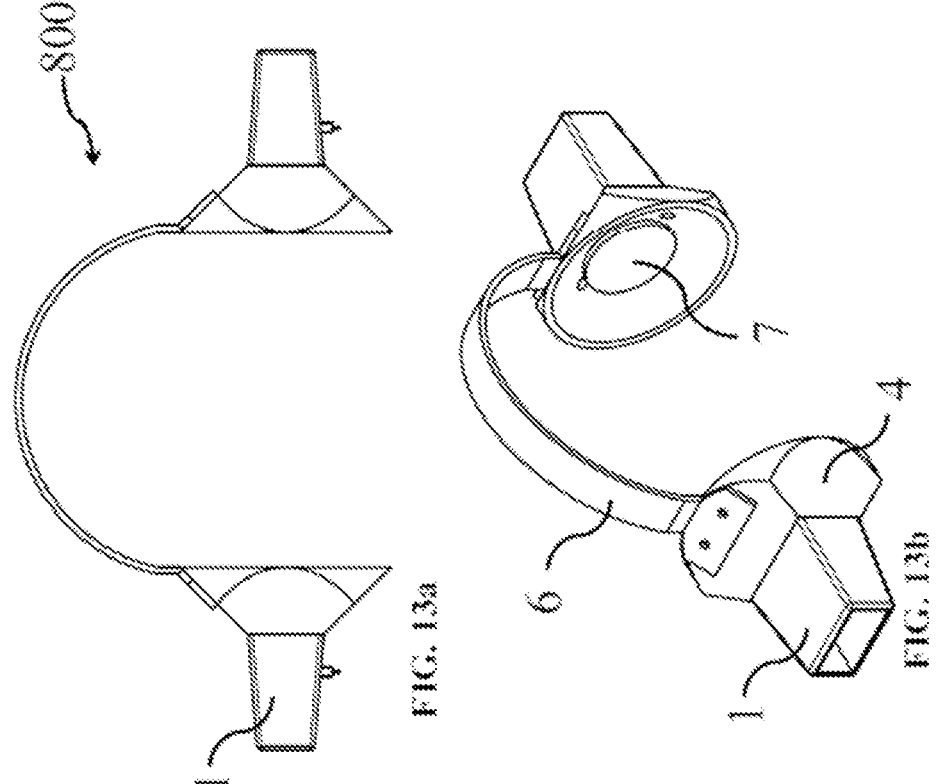
Figures 13C, 13D:
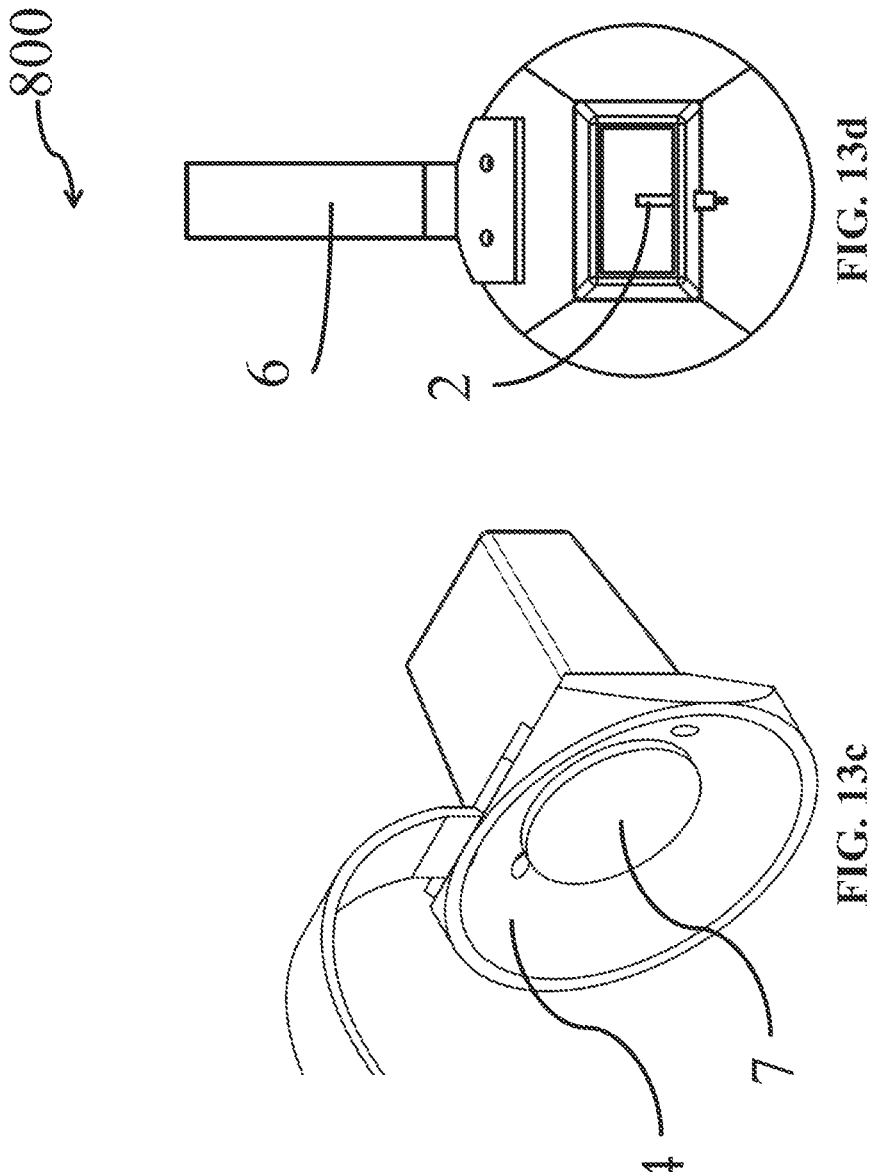
Figures 14A, 14B, 14C, 14D:
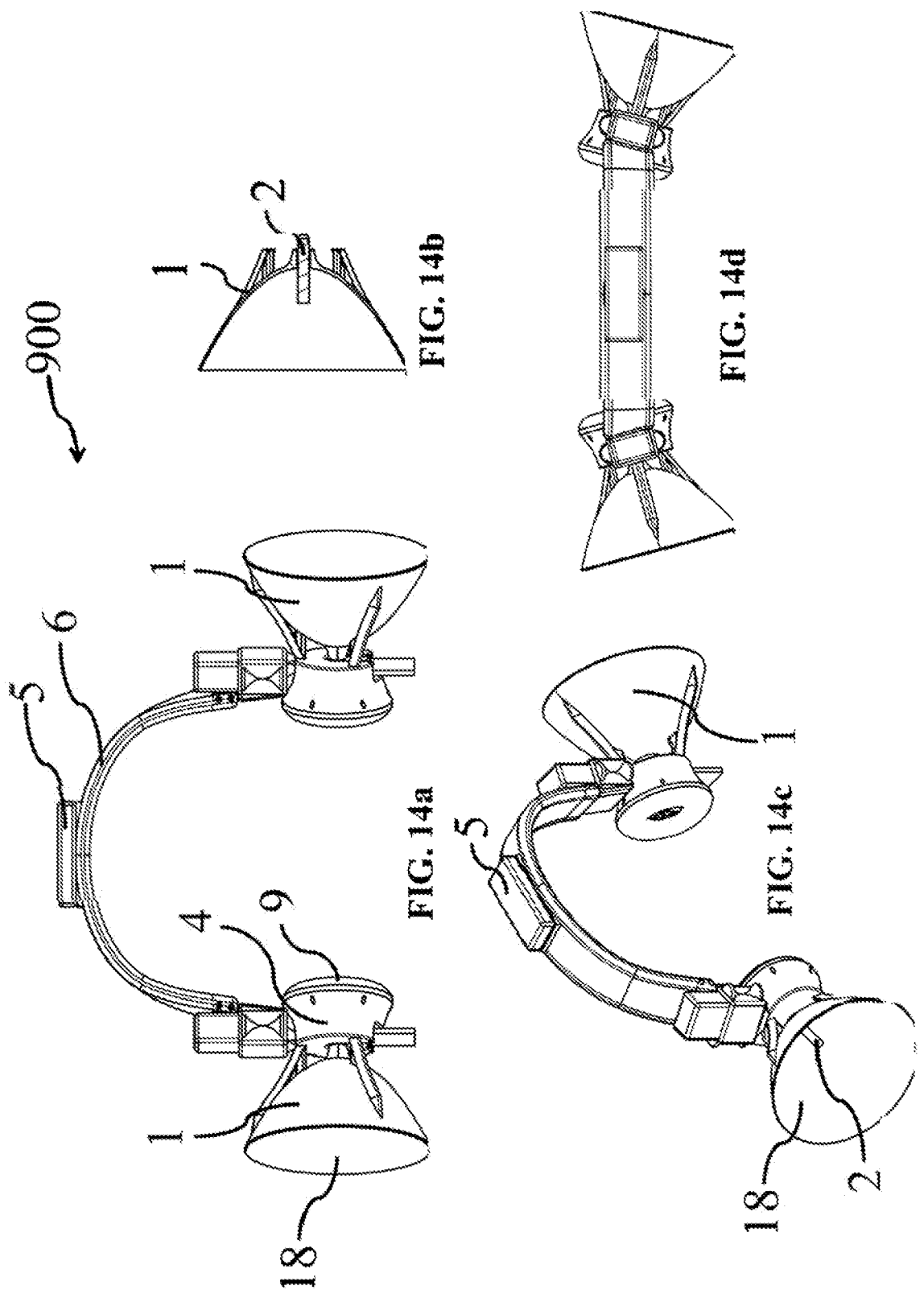
Figures 15A, 15B, 15C:
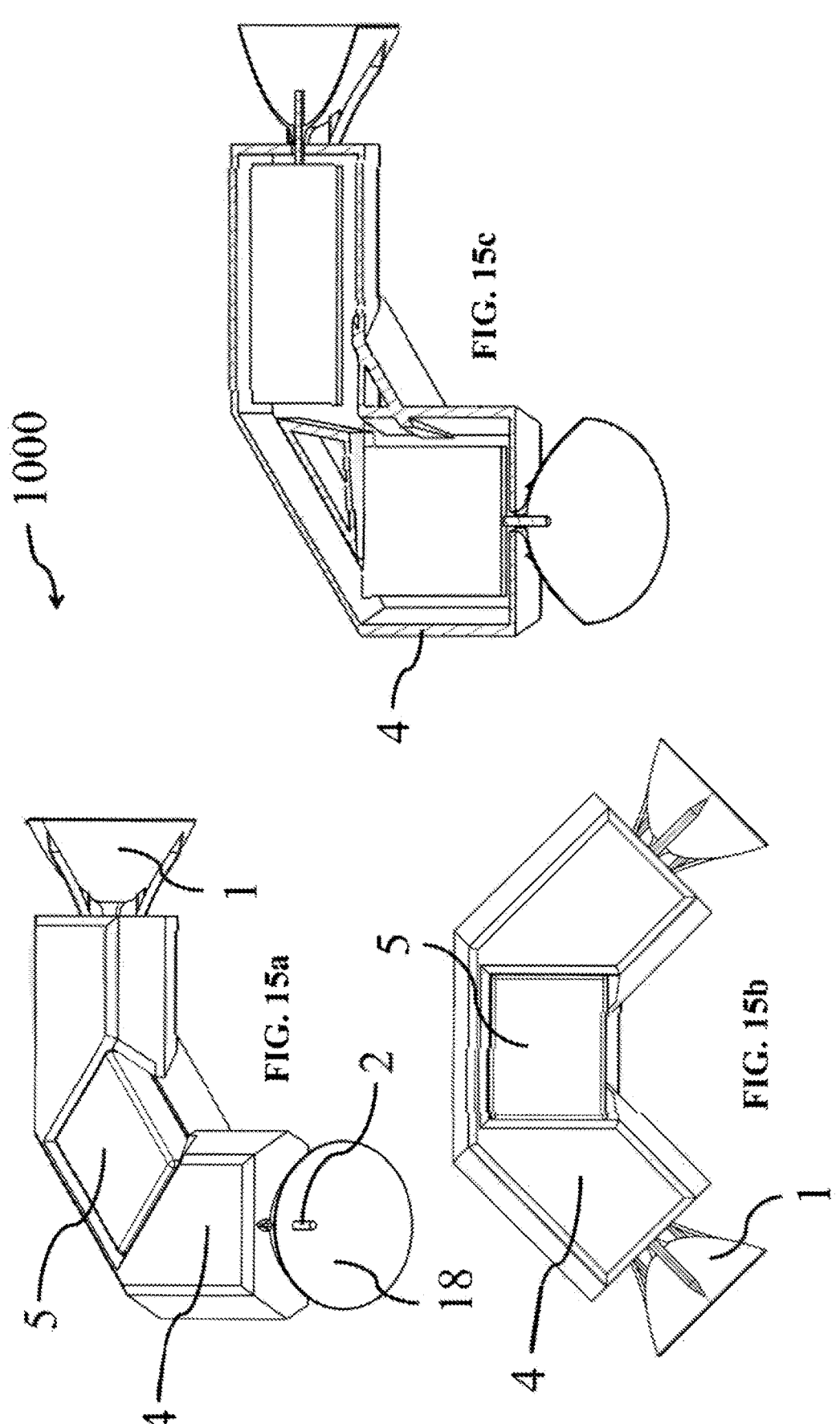
Figures 16A, 16B, 16C:
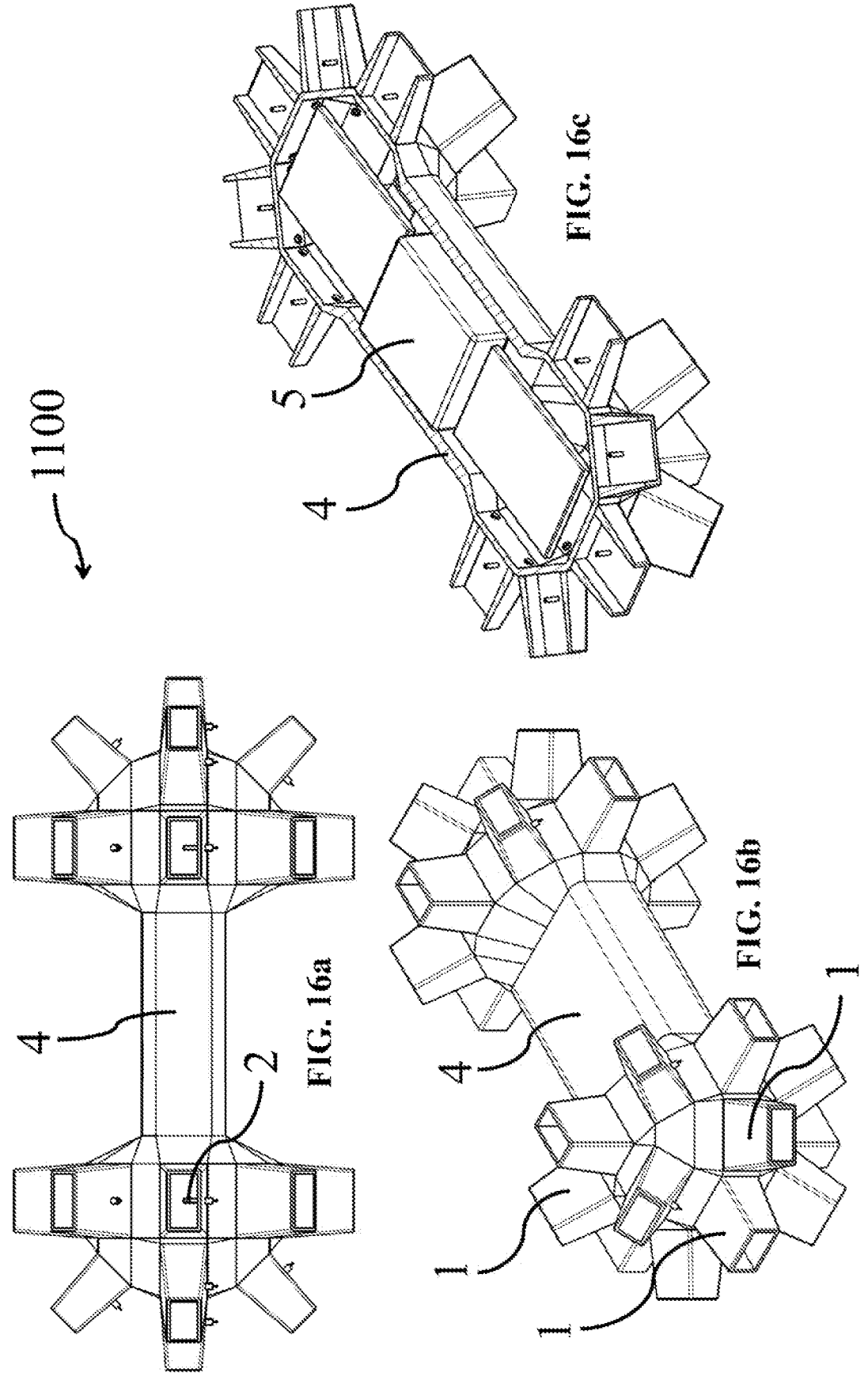
Figure 17:
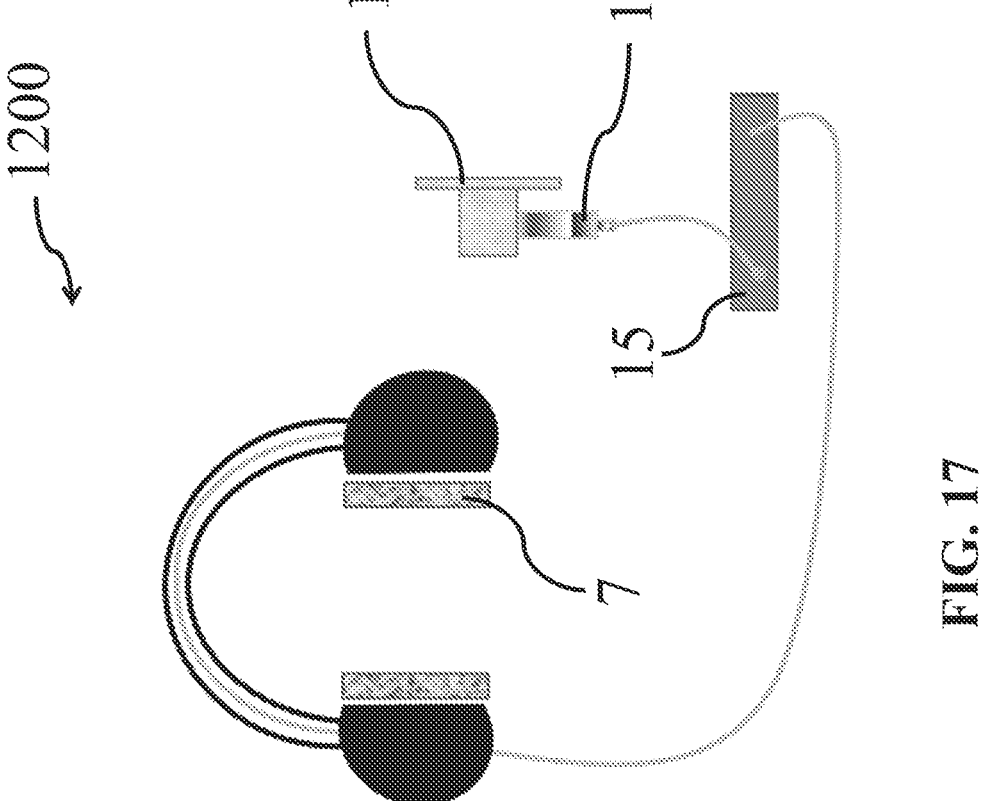

FIG. 9a illustrates a square waveguide-based NED tuned for 24 GHz (front view);

FIG. 9b is a back view of the square waveguide-based NED shown in FIG. 9a;

FIG. 9c is a top view of the square waveguide-based NED shown in FIG. 9a;

FIG. 10a illustrates a square waveguide-based NED tuned for 60 GHz (front view);

FIG. 10b is a back view of the square waveguide-based NED shown in FIG. 10a;

FIG. 10c is a top view of the square waveguide-based NED shown in FIG. 10a;

FIG. 11a illustrates an n-phonic speaker-holding acoustical waveguide structure for a 5.8 GHz NED (front view);

FIG. 11b is a back view of the n-phonic speaker-holding acoustical waveguide structure shown in FIG. 11a;

FIG. 11c is a top view of the n-phonic speaker-holding acoustical waveguide structure shown in FIG. 11a;

FIG. 12a is a front view of a circular speaker for NED;

FIG. 12b is a side cross sectional view of the circular speaker shown in FIG. 12a;

FIG. 12c is a front view of a rectangular speaker in the back of acoustically reflective rectangular cavity;

FIG. 12d is a side view of the acoustically reflective rectangular cavity shown in FIG. 12c;

FIG. 12e is a front view of a circular speaker in an acoustically reflective cavity;

FIG. 12f is a side view of the circular speaker in an acoustically reflective cavity shown in FIG. 12e;

FIG. 12g is a front view of a speaker in a circular cavity made of acoustically absorbing material;

FIG. 12h is a side view of the circular cavity made of acoustically absorbing material shown in FIG. 12g;

FIG. 13a is a front view of a rectangular waveguide-based SED tuned for 5.8 GHz;

FIG. 13b is a side perspective view of the rectangular waveguide-based SED shown in FIG. 13a;

FIG. 13c is a view of the inner speakers of the rectangular waveguide-based SED shown in FIG. 13a;

FIG. 13d is a side view of one of the waveguide antennas of the rectangular waveguide-based NED shown in FIG. 13a;

FIG. 14a is a front view of a wearable parabolic waveguide-based SED tuned for 5.8 GHz;

FIG. 14b is a cross section of the parabolic waveguide antenna shown in FIG. 14a;

FIG. 14c is a front perspective view of the wearable parabolic waveguide-based SED shown in FIG. 14a;

FIG. 14d is a top view of the wearable parabolic waveguide-based SED shown in FIG. 14a;

FIG. 15a is a front perspective view of a mountable parabolic waveguide-based SED tuned for 5.8 GHz;

FIG. 15b is a top view of the mountable parabolic waveguide-based SED shown in FIG. 15a;

FIG. 15c is a cross section view showing the energy detectors inside the supporting structure of the mountable parabolic waveguide-based SED shown in FIG. 15a;

FIG. 16a is a front view of a mountable rectangular waveguide-based NED tuned for 5.8 GHz;

FIG. 16b is a front perspective view of the mountable rectangular waveguide-based NED shown in FIG. 16a;

FIG. 16c is a cross section view showing the energy detectors and computer inside the supporting structure of the mountable rectangular waveguide-based NED shown in FIG. 16a; and FIG. 17 is a circuit diagram of a monophonic energy detector (MED) setup.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Example embodiments that incorporate one or more aspects of the apparatus and methodology are described and illustrated in the drawings. These illustrated examples are not intended to be a limitation on the present disclosure. For example, one or more aspects of the disclosed embodiments can be utilized in other embodiments and even other types of devices. Moreover, certain terminology is used herein for convenience only and is not to be taken as a limitation. The user of the SED or NED can be understood to be human or machine, although other user types are possible.

The devices described in the present disclosure can be used to augment the human auditory system with the ability to perceive radio frequency (RF) energy. In the embodiments described below, assumptions were necessary to prepare these devices for the human auditory system, and the human mind's method of rationalizing sound. However, embodiments are not limited thereto and other configurations are possible. For example, in certain embodiments, a computer may process the output of energy detectors, rendering some of these assumptions unnecessary or requiring additional design considerations.

Commonly used devices, such as radios, cordless and cellular telephones, garage door openers, wireless networks, radars, and microwave ovens, for example, emit electromagnetic (EM) energy. All of these devices are located somewhere in the three-dimensional space and interact electromagnetically with one another. Generally, localization includes direction finding (i.e., determining the angle of azimuth or elevation angle at which the acoustic signal arrives) and processing or analyzing (i.e., determining the frequency spectrum) of the signal. The angle of arrival and frequency information of the signal can be used to detect and follow the movements of a moving body.

The human brain is capable of perceiving the spatial relationships among sound sources. In other words, the human brain can localize RF energy signals converted to sound, as described below, using sound localization. For example, persons with the ability to hear can be aware of their surroundings. In a stationary location, a person can hear birds chirping in various locations, the splashing of water in a fountain, the sound of that splashing water reflecting off of a nearby building, the typing of a keyboard, the leaves blowing in the trees above, the wind blowing across their ear, a fly wiz by their ear, and something clacking against a distant flagpole, for example. The ability of humans to locate sound sources, using their ability of sound localization, suggests that humans can localize RF energy signals that have been converted to audio signals by the SED or NED. Once RF energy is localized, signatures in the RF energy from each source can be perceived for spatially orthogonal wireless signals.

Figure 1:
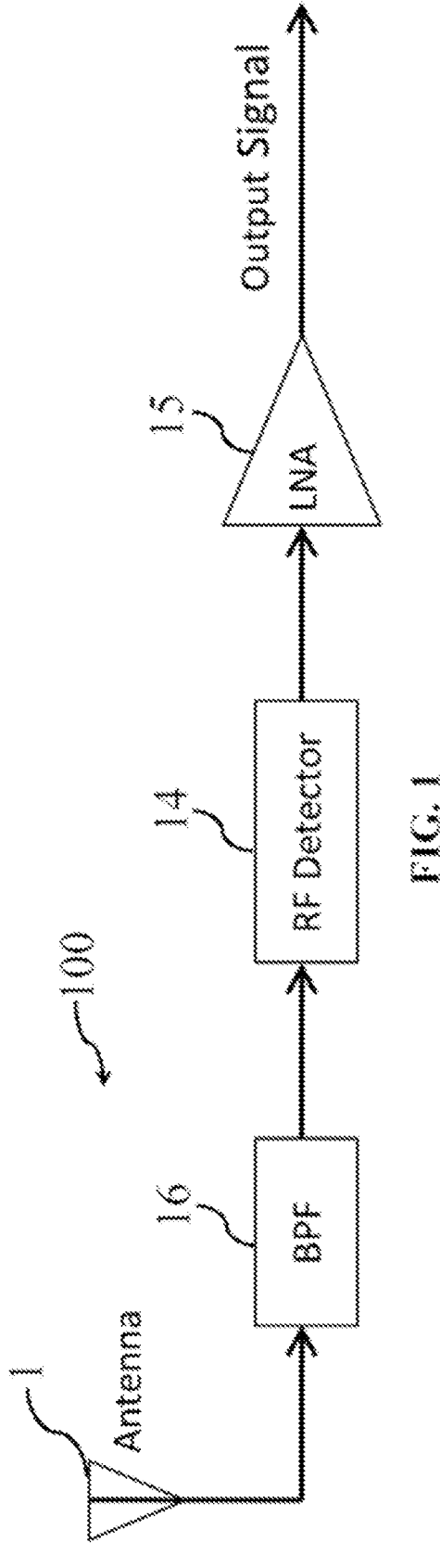
FIG. 1 is a schematic diagram of an energy detection system used in a monophonic energy detector (MED), a stereophonic energy detector (SED), and an n-phonic energy detector (NED)

An energy detection system is illustrated in FIG. 1. A radio frequency (RF) input signal is received by an antenna 1. The RF input signal may then be filtered by a bandpass filter (BPF) 16 to restrict the RF input signal to frequencies contained in the band of interest. The filtered input signal is supplied to an RF detector 14 that converts the input signal into an audio signal (i.e., sound). For example, the RF detector can be an envelope detector that detects variations in the phase or the amplitude of the input signal, and transforms the input signal in pulse trains of finite duration pulses at baseband, centered at f=0. The transformed baseband signals can produce audible tones in the kHz range that represent the RF signals received. However, it is also expected that there may be frequencies in the energy signals that extend well beyond the kHz range. The output signal may be further analyzed by a computer or other signal processing may be performed in order to take into consideration the higher frequency components for more precise RF energy measurements. The filtered input signal can also be isolated and amplified, for example through a low-noise amplifier (LNA) 15, to achieve the design performance and mitigate noise impact. The volume of the low-noise amplifier (LNA) 15 can be adjustable by the user. In addition, the user may want sensitivity control for the energy detectors, and tone control. The SED or NED may have physical knobs or other physical buttons as desired in order to allow a user to comfortably adjust the volume, sensitivity, tone, or other settings of the device. A power switch may be desired as well. In some embodiments, these physical knobs and buttons may not be needed, or others may be desired. The signal at the output of the low noise amplifier (LNA) can be passed either to a speaker or to a computer for further processing. The RF detector shown in FIG. 1 can be a surface-mount RF detector, such as a passive envelope RF detector commercially available from Linear Tech, for example. The RF detector can be logarithmic, for example. The LNA and the RF detector can be arranged on a circuit board within the headphones, and the device can resemble over-the-ear headphones, for example. Additionally, the NED and SED can be powered with internal or external batteries or a DC power supply as needed. The SED or NED can have a battery charging circuit as needed.

The energy detector shown in FIG. 1 can be used in both a monophonic energy detector (MED) and a stereophonic energy detector (SED). An n-phonic energy detector (NED), where "n" is an integer greater than or equal to 1, can also be realized with a similar energy detector system. For example, a NED where n is equal to one corresponds to a MED, and a NED where n is equal to two corresponds to a SED. In certain embodiments, it may be beneficial if a computer or a general processor can take over control of the volume of the low-noise amplifier (LNA) and the filtering capabilities of the bandpass filter (BPF). It can be beneficial if the BPF is fully tunable, allowing arbitrary filter shapes. Alternatively, the bandpass filter (BPF) may function as a traditional BPF with a variable width and a center frequency. Additionally, a cost effective and flexible solution would be to use a computer to implement a software defined radio (SDR) to implement energy detector channels. The SDR would make it easy to implement more than one energy detector per antenna, as needed. In the future, when analog to digital converter (ADC) and DAC technology improves, direct RF sampling of the antennas can be performed and the computer can implement a SDR to implement energy detection channels, even when RF signals received by the antennas are in the mmWave range, which is a challenge for current ADC and DAC technology.

In one embodiment (shown in FIG. 17), the monophonic energy detector (MED) can include commercially available parts, such as a waveguide to coaxial adapter acting as an antenna 1, an RF detector 14, a low noise audio amplifier 15, and a set of monophonic headphones 7. The waveguide to coaxial adapter 1 can be tuned to accept frequencies between 4 GHZ and 6 GHz, for example. The RF detector 14 can be connected to the coaxial connector of the waveguide adapter 1. The output of the RF detector 14 can be connected to the input of the low noise amplifier 15. The output of the low noise amplifier 15 can be connected to the headphones 7. The waveguide to the coaxial adapter 1 acting as a beam former, can be held in a person's hand, and can be directed at devices such as a Wi-Fi router operating in the 5.8 GHZ ISM band. When the MED is directed at a router transmitting at a frequency accepted by the MED, the digital pulse trains emitted from the router can be perceived by the user in the form of audible tones in real time.

Known monophonic RF detectors generally use one omni-directional antenna and are hand-held by the user. The monophonic RF detector may make an audible tone if it detects an RF signal nearby. An RF emitting device can be located with monophonic RF detector; however, the user experience when using a monophonic RF detector is similar to playing a game of "hot and cold". For example, the monophonic RF detector can indicate if the user is approaching the RF source or moving away from the RF source by producing sound, light, or vibration events. In other words, the user experience with the monophonic RF detector is similar to that of a friend telling you "you are getting warmer" or "colder" to a searched target.

In contrast, the user experience with the stereophonic or n-phonic RF energy detector is like a game of "Marco, Polo". For example, if the user is Marco in a typical game of "Marco, Polo" with his eyes closed, he can say "Marco" and everyone else can say "Polo". The user ("Marco") can use his spatial sense of sound to determine which person is closest. Similarly, with the SED or NED, the user's sense of hearing is more directly connected to the RF space. To imagine what the game of "Marco, Polo" would be like with the monophonic hand-held RF detector, one can think of the following situation: The user can hear nothing, except a small monophonic "walkie talkie"-type hand-held device. If the user says "Marco" into the device and every other player says "Polo", the sounds from every other player would come from the speaker on the "walkie talkie"-type hand-held device. The user ("Marco") can wave it around, saying "Marco" and listening for every other player's "Polo", but the user's experience would be severely limited in that the user ("Marco") would not be able to determine where the real "Polo" sounds are coming from. In contrast, the SED or NED is connected more directly to the user's senses, with antennas corresponding to speaker placement to produce spatial sound.

In the case when a user is wearing the SED as a set of stereo headphones, for example, the user can walk around and notice the change in location of an RF source as the user moves his head, as well as if there is change in the intensity of the audio produced. With this real time feedback, the user can locate RF energy sources in three dimensions. Users can locate the position of RF sources by using the directional nature of the two (SED) or a number "n" (NED) antennas, instead of just relying on the principle of time difference of arrival of sound at multiple nodes relative to an RF start time reference point, for example. If the SED were stationary, there could be a two-dimensional ambiguity from the symmetry of the stereo device. A stationary NED can eliminate this ambiguity and enable truly three-dimensional energy localization.

Figure 2:
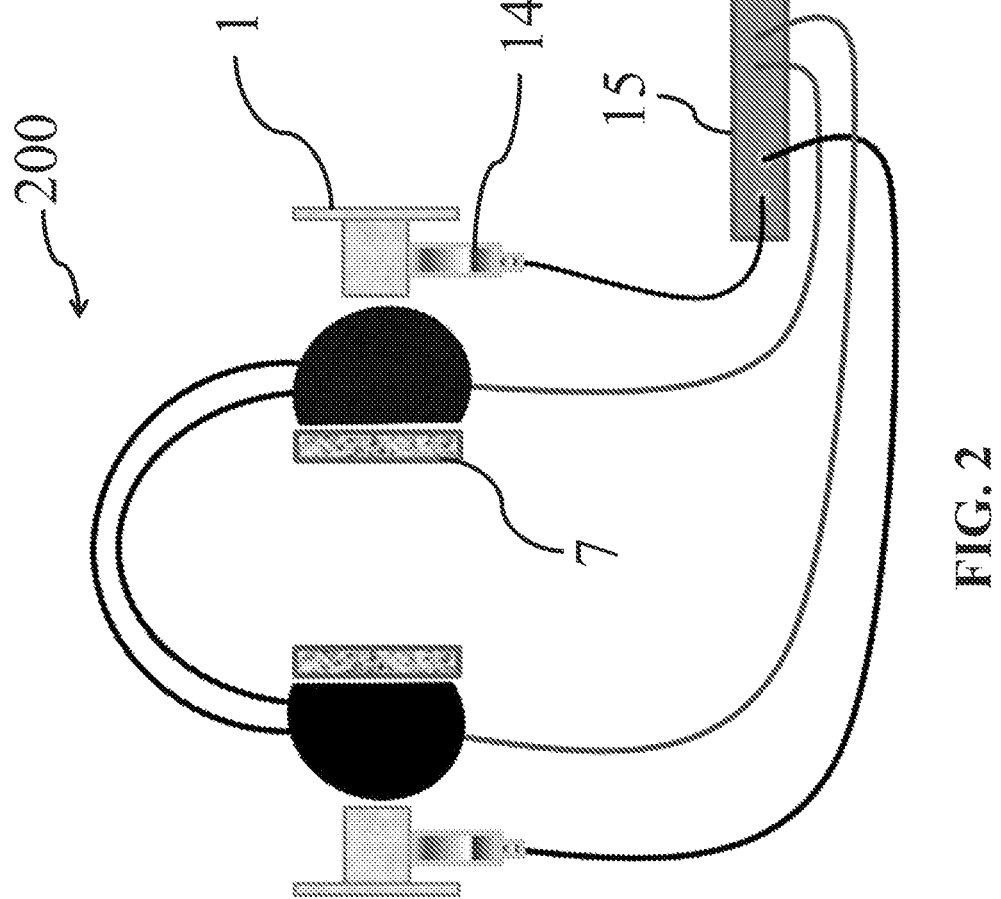
FIG. 2 is a circuit diagram of a stereophonic energy detector (SED) setup.

For the stereophonic energy detector ("SED"), such as the embodiment shown in FIG. 2, two waveguides to coaxial adapters acting as directional antennas 1 can be affixed to a set of stereo headphones 7. A stereo low noise audio amplifier 15 can be used to amplify the small signals from the RF detectors 14. The output of the left RF detector 14 can be amplified by the low noise audio amplifier 15 and routed to the left channel (e.g., speaker 7) of the stereo headphones 7. The output of the right RF detector 14 can be amplified by the low noise audio amplifier 15 and routed to the right channel (e.g., speaker 7) of stereo headphones, each configured to be placed adjacent (i.e., in close proximity sufficient to provide audible sound) to one of the user's ears. Each speaker 7 shown in FIG. 2 receives an audio signal from an energy detection system 100 illustrated in FIG. 1. For example, as shown in FIG. 2, a speaker 7 worn on the left ear receives a signal from an antenna 1 worn on the left ear via an RF detector 14 and an amplifier 15 and a speaker 7 worn on the right ear corresponds with an antenna 1 worn on the right ear via another RF detector 14 and an amplifier 15. Example stereophonic energy detector ("SED") embodiments are illustrated in FIGS. 13a-d, FIGS. 14a-d and FIGS. 15a-c. FIGS. 13a-d illustrate a wearable SED that has rectangular antennas 1. FIGS. 14a-d illustrate a wearable SED that has parabolic antennas 1 and a computer 5. FIGS. 15a-c illustrate a mountable SED that has parabolic antennas 1 and a computer 5. The SEDs in FIGS. 14a-d and in FIGS. 15a-c have antennas that are angled toward the direction the user is facing. To perform many of the experiments with the SED tuned for Wi-Fi, an iPhone 6s can be connected to Wi-Fi and an internet speed test can be performed.

The embodiment illustrated in FIG. 2 depicts a stereophonic energy detector (SED) that includes a set of stereophonic headphones to reproduce audio tones from energy detectors. However, embodiments are not limited thereto and other configurations are possible. For example, in certain embodiments, a set of n-phonic headphones may be necessary for the eventual realization of an n-phonic energy detector for truly three-dimensional RF energy localization. In further embodiments, an SED may use earbud speakers for portability reasons, for example.

In principle, the SED is limited to only two-dimensional energy localization. However, if the SED is a real time device that the user wears, the user can tilt and turn his/her head if there is ambiguity in locating an energy source with the SED in space. This user interaction provides feedback to the user that can compensate for the two-dimensional limitations of the SED. In addition, as the user walks around and moves his/her head, the user can be aware of whether he/she is walking toward or away from an RF energy source of interest. This RF energy localization is analogous to how the human mind typically locates and recognizes the sources of everyday sounds. This feedback can provide the user with the ability to locate RF energy sources in three dimensions. However, the two-dimensional limitations of the SED and stereo headphones in theory suggest that an n-phonic energy detector and complementary n-phonic headphones may be required for a true three-dimensional RF energy localization. The human hearing range is roughly from 16 Hz to 20 kHz. Current digital modulation methods produce audible tones in the kHz range using the simplified energy detection system shown in FIG. 1. Modulation schemes for digital devices include quadrature amplitude modulation (QAM) for Wi-Fi and Gaussian frequency-shift keying (GFSK) for Bluetooth. For QAM, information is encoded in the phase and amplitude of the signal. For GFSK, no information is encoded in the amplitude of the signal. These signals have certain amplitudes. The energy detector system shown in FIG. 1 applied to digital communication signals results in pulse trains of finite duration pulses at baseband. The Fourier transform of a finite duration pulse spans the frequency domain from negative infinity to infinity. For example, the Fourier transform of a rectangular pulse in the time domain is a sinc function in the frequency domain. The Fourier transform of a Gaussian pulse in the time domain is a Gaussian in the frequency domain. The energy detector system of the present embodiment results in signals at baseband, and the Fourier transform of these finite duration pulses are centered at f=0. Therefore, it is feasible to expect that these baseband signals produce audible tones in the kHz range. It is also expected that there are frequencies in the energy signals that extend well beyond the kHz range. The output signal may be further analyzed by a computer or other signal processing may be performed in order to take into consideration the higher frequency components for more precise RF energy measurements.

Figure 3:
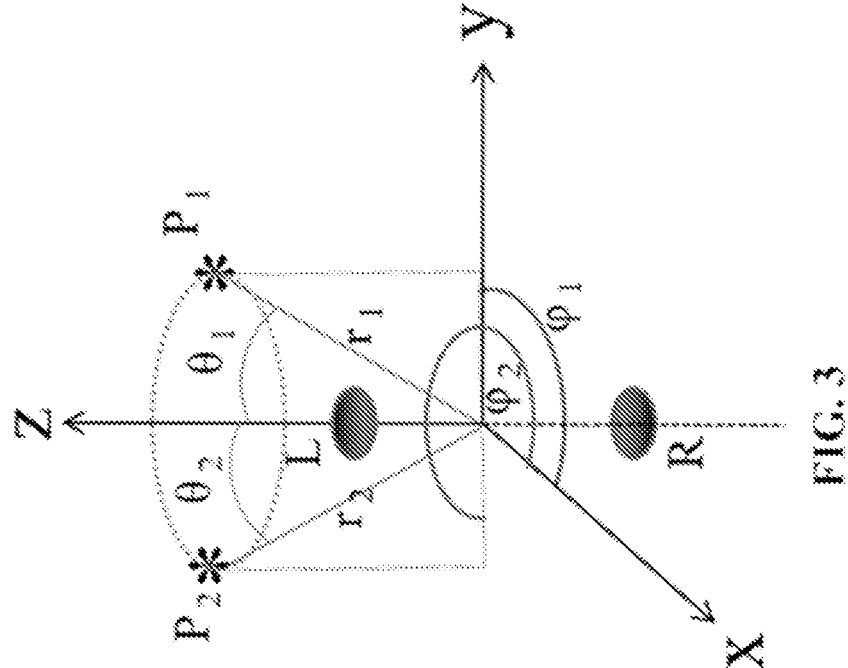
FIG. 3 is a schematic diagram illustrating the symmetry of an ideal set of stereo headphones, two microphones, and a SED.

As further shown in FIG. 3, two points (shown as ellipsoids and labeled L and R) separated by some distance, correspond to the left and right speakers of a set of stereo headphones, two microphones, or the energy detectors of the SED illustrated in FIG. 2, for example. The ellipsoids L and R indicate the points at which the symmetrical left and right speakers (or detectors) are located. Assuming that $|r1|=|r2|=r$, and $\theta1=\theta2=0$, the initial analysis in spherical coordinates uses two simple audio microphones. The received signal at the left or right microphone is the same for an omnidirectional sound source placed at P1, P2 or any other point on a concentric ring found by varying $\varphi$. The stereo headphones and the SED can be analyzed in a similar manner. This symmetry can be broken in order to reduce or eliminate ambiguity in locating signals directly in front or behind the user, as illustrated in FIG. 3, for example. The symmetry can be broken by tilting the directional antennas forward, in the direction the user is facing as shown in some embodiments such as SED embodiment 900 shown in FIGS. 14a-d and SED embodiment 1000 shown in FIGS. 15a-b. The ambiguity in locating signals directly in front or behind the user can also be reduced or eliminated by using directional antennas that provide asymmetrical beamforming.

When testing the SED, a variety of concepts relating to electromagnetics and wireless communications were perceived intuitively. The location of RF emitting devices was apparent as the human mind can localize the EM energy sources with the SED. When wearing an SED in a room, for example, a sound of a laptop placed across the room and communicating with a router on the ceiling was heard. The sounds from the transmitting laptop could be focused on, or with a slight tilt of the head the line of sight (LOS) signal from the router was strengthened. Due to the uniqueness of the sounds and abrupt pauses in the energy signals emitted from two devices while communicating with each other, it can be deduced which devices are communicating with each other at any given time. Each device, such as a phone or a laptop, for example, can be focused on, similar to a focus a person can use when listening to others talk in a noisy environment such as a restaurant, for example.

When walking around a building equipped with multiple Wi-Fi access points, further wireless communication effects were noticed with the SED. When a cell phone is connected to the Wi-Fi and is carried through a building, the location of any communicating routers can be apparent. In addition, hand-off between routers occurs as the cell phone is carried. When the wireless link between the cell phone and a router changes in signal strength or quality, the device changes transmission settings (i.e. modulation, coding scheme, transmit power). When the cell phone is close to a router, a configuration is selected that provides a relatively high data rate, resulting in a colorful variety of audible tones perceived with the SED. As the cell phone is carried farther from a router, the communication switches to a more robust configuration that sounds more like 8 bit audio.

Walking into an elevator with an SED can also be an interesting experience. An elevator is like a Faraday cage. Initially, it was assumed that much of the RF activity previously experienced would be blocked out when riding in the elevator and it would be a lot quieter in terms of RF energy than previously experienced. When the elevator was entered and the doors slid closed, the cell phone that had been used for the previous tests initiated a sort of a panic mode. It maxed out its transmission power, switched to the most robust coding scheme it had, and produced quite the energy show to try to get its word out. A standing wave interference pattern including nodes and anti-nodes was perceived with the SED. The cell phone's effort was ultimately a failure.

When outside with the SED for the first time in an urban area, an entirely new and non-trivial world of energy was perceived. Very small energy signals, some of which appeared to come from a relatively vast distance, were perceived. An immense number of Wi-Fi sources, such as Wi-Fi antennas located on light poles and on the sides of buildings, were perceived.

Figures 4A, 4B:
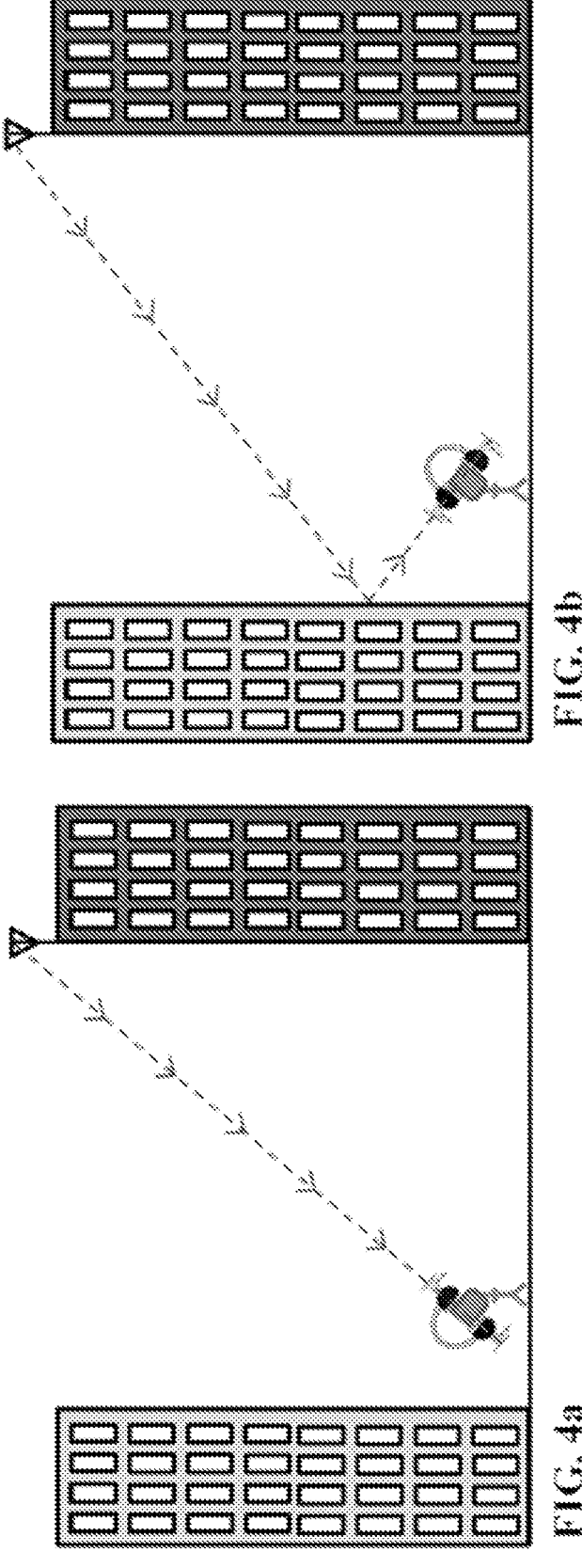
FIG. 4a is a schematic diagram illustrating a multipath isolation of the line of sight (LOS) with the stereophonic energy detector.
FIG. 4b is a schematic diagram illustrating a multipath isolation with the stereophonic energy detector and reflected signal traced to the source.

These experiments demonstrate that the SED can be used to consider multi-path propagation of wireless signals. For example, a Wi-Fi antenna located high on the side of a building was used as a reference and the following experiment performed. FIG. 4 illustrates how the SED can perform a multipath analysis. Although the multipath examples in FIG. 4 are drawn in two dimensions for simplicity, the SED can be used in the real world to trace three-dimensional multipath propagation. With the SED, the "rays" can be found in the three-dimensional space. If a signal reflects off of multiple buildings, its reflections can be traced back. With the SED, the line of sight (LOS) ray can be isolated from the reflected ray. To find the LOS ray, the signal strength from the antenna can be maximized by tilting and rotating a person's head. The right or left antenna of the SED can be pointed directly at the RF source. If the ray is visualized through the skull from one ear to the ear nearest the RF source, the ray can strike the source. To find the other multipath rays, a person can rotate and tilt his/her head around while listening for another local maxima in the signal strength. Once a second maxima is found, the person can draw a ray from ear to ear like before, and may find that the ray reflects off an adjacent buildings and eventually back to the source. This way of illustrating ray tracing may be a good illustration for ray tracing with a SED with symmetry as shown in FIG. 3, for example. In general though, the rays can be found by maximizing signal strength by directing the antennas of the SED or NED in the LOS direction of the target, and by finding reflected rays with similar RF signature, but possibly lower amplitude, different phase and a slight time delay. Ray tracing algorithms can be implemented on the SED or NED's computer in order to locate sources of RF energy.

Immediately upon entering a building that was heavily populated, an interesting effect was perceived with the SED. When walking at a regular pace, the tester's head started to spin a little bit because the SED audio seemed to be wavy. After stopping, the perceived RF signals seemed to return to normal. When starting to walk again, the intensity of the RF energy signals was found to oscillate a little. The frequency of this oscillation was proportional to the speed of walking. After stopping again, the SED was moved slowly forward and backward to find two peaks in the energy signal. The distance between these peaks appeared to be on the order of the wavelength corresponding to Wi-Fi in the 5 GHZ ISM band. This indicated the presence of multiple interference nodes and anti-nodes.

When walking by a metal fence, approximately 10 ft tall with parallel bars spaced about 6 inches apart, shadowing effects were perceived. A strong Wi-Fi signal off in the distance behind the bars was focused on. While walking by the fence, the presence of each bar obstructing the path was apparent. The bars could be counted if desired. Upon this realization, the presence of objects, such as streetlight poles and vehicles that occasionally shadow signals while walking were noted. An awareness of nearby objects is, therefore, possible with the SED via this shadowing effect.

Directional antennas and directional speakers can be utilized to implement theories of spatial hearing and human sound localization. In order to implement the directional antennas of the SED or NED described above, a variety of antennas, such as the antennas illustrated in FIGS. 5a-f, can be used. The waveguide antennas illustrated in FIGS. 5a-f can include antenna feed probes 2. The interior of the waveguide antennas can be coated with metallic conductive surfaces. These metallic conductive surfaces can contribute a high reflectivity at the frequencies of interest. Example conductive coatings can include copper foil, gold foil and conductive graphite paint. Conductive graphite paint can be made by using graphite powder and acrylic glazing liquid, for example. Marble textured surface in FIGS. 5b and 5d, for example, represents the outer surfaces of the waveguides for illustrative purposes. Specifically, FIG. 5a illustrates a front view of a rectangular linearly polarized waveguide. FIG. 5b illustrates a side view of the rectangular linearly polarized waveguide shown in FIG. 5a. FIG. 5c illustrates a front view of a circular waveguide, which accepts both horizontally and vertically linearly polarized signals. FIG. 5d illustrates a side view of the circular waveguide shown in FIG. 5c. FIG. 5e illustrates a front view of a circular Yagi antenna. FIG. 5f illustrates a side view of the circular Yagi antenna shown in FIG. 5e. In addition, parabolic antennas as illustrated in FIG. 14b can be used, especially when highly directional and high gain antennas are required. By placing the antenna feed 2 symmetrically at the back of the parabolic antenna 1, as shown FIG. 14b, for example, the parabolic antenna 2 can accept both horizontal and vertical linearly polarized signals. Parabolic trough-type antennas can also be used. Elliptical antennas can be used to extract very weak signals with high spatial precision. In some embodiments, the NED or SED may need to focus on one small area in space. In this case, it may be desirable to use elliptical antennas. For example, a SED with two elliptical antennas could be directed forward, in the direction the user is facing, such that their foci overlap some distance away from the user. If the user places an emitter, or a device of interest, in the location of the overlapping foci, the user would extract very weak signals from the device. Additionally, if a NED array of elliptical antennas were all focused to a small area, RF energy could be localized with high precision. In addition, it might be beneficial to use lenses for each antenna of the NED or SED, or lenses that could be used for multiple antennas at once. For example, for a NED tuned for energy in the millimeter wave range, it might be beneficial to use a relatively large lens, or a system of lenses to focus the RF energy onto the NED array. This concept is similar to using lenses to focus light onto the detector arrays in a digital camera to bring an image into focus; lenses can be used to focus RF energy onto NED arrays. Patch antennas can be used as a cost-effective solution for antenna arrays, although their gain and performance can be relatively poor. Conical antennas, horn antennas, helical antennas, pyramidal horn antenna, exponential horn antenna, corrugated horn antenna, spiral antennas, slot antennas, fractal antennas, cloverleaf antennas, or many other antennas can be used in the SED or NED. Although a few antennas are discussed as examples here, SED and NED embodiments are not limited to using these antennas, many other antennas can be used.

In certain embodiments, it may be more convenient to coat the outside of the waveguide antennas similar to FIGS. 5a-d with a conductive material (reflective surface), instead of the inside. Some plastics can be relatively transparent at microwave frequencies. If for example a rectangular box were made out of plastic, five of the six outer sides of the box could be coated in conductive (reflective) material (leaving one side uncoated to accept the electromagnetic waves into the waveguide). This might be easier to make, and could perform relatively well. It may also be desirable to use dielectric rods or cylinders (hollow or solid), to sample energy. These rods may have some outer surfaces coated in conductive (reflective) material, leaving the tips exposed to accept electromagnetic waves into the waveguide.

The example antenna shown in FIG. 5a can be a commercially available waveguide to coaxial cable adapters that can target linearly polarized signals (e.g., single polarization). However, the standard rectangular waveguide antenna illustrated in FIG. 5a can be limiting. Specifically, when the user is wearing the SED, if a linearly polarized antenna of a Wi-Fi emitter of interest (on a router, for example) is not in proper alignment with the rectangular waveguide antenna, the received signal can be weaker than desired, and weakest when the antennas are 90 degrees out of alignment. This undesirable effect can be avoided by using linearly polarized antennas accepting both vertical and horizontal polarizations, such as the antenna shown in FIGS. 5c and 5d, for example.

FIGS. 5e and 5f show a circular Yagi-like antenna that uses passive reflectors to achieve a microwave resonant device.

Figures 6A, 6B, 6C, 6D:
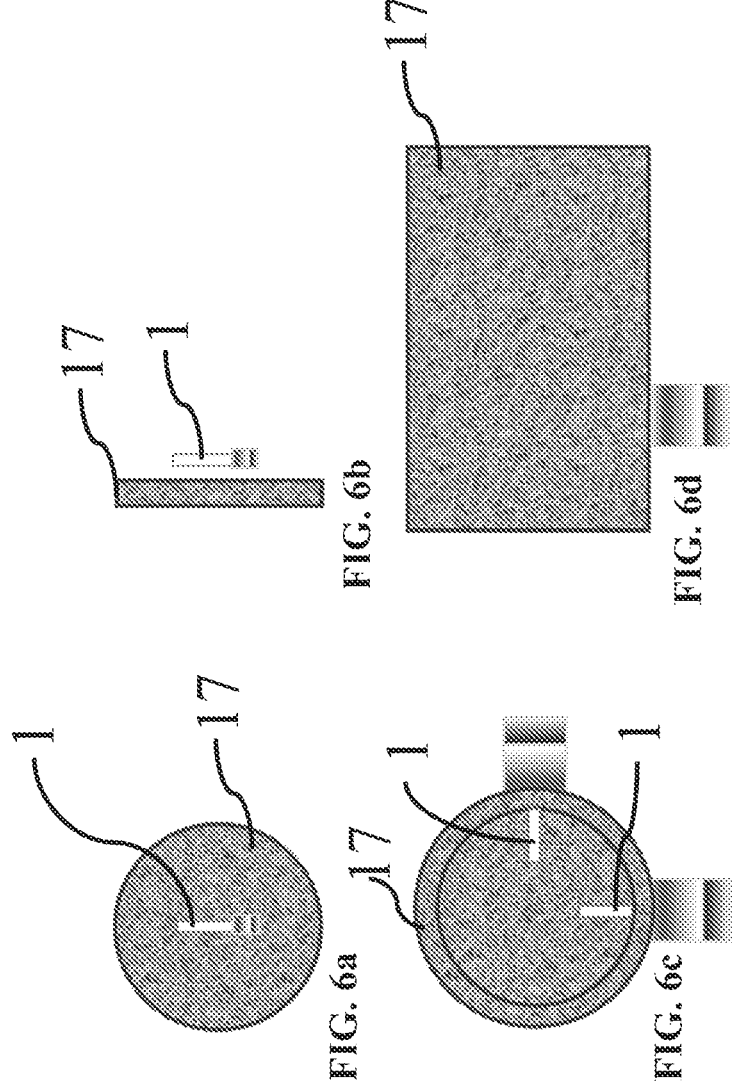

In further embodiments, a directional antenna can be created by using an omnidirectional antenna 1 and absorbing RF foam or material 17. This configuration can be suitable for the SED or NED. Such example antennas are illustrated in FIGS. 6a-d. FIG. 6a illustrates an omnidirectional antenna 1 positioned next to an RF absorbing material 17 in order to produce a more directional implementation. FIG. 6b illustrates a side view of the omnidirectional antenna 1 shown in FIG. 6a positioned next to the RF absorbing material 17. FIG. 6c illustrates antennas 1 positioned in a cavity made of RF absorbing material 17 (both horizontally and vertically linearly polarized). FIG. 6d illustrates a side view of the RF absorbing material 17 cavity shown in FIG. 6c.

RF conductive coatings can be applied to the outside of these RF absorber style antennas to increase directivity of the antenna. For example, if RF energy would have penetrated the RF absorbing material cavity-like structure through a wall or side of the structure due to the material not absorbing the energy completely, if the outside of the cavity were coated in conductive material, more of this RF energy entering from the undesirable side would be reflected, increasing the directivity of the antenna in the direction of interest.

For some antennas the bandwidth may be wide and additional bandpass filters (BPF), possibly configurable for the width of the frequency bands of interest and the center frequencies variable by the user or attached computer may be necessary, so that the user can "tune in" to specific frequencies of interest, while suppressing others.

In other embodiments, it may be desirable to analyze signals that are circularly polarized. In these embodiments, antennas can be used for circularly polarized signals.

One embodiment of the NED can use a 3D model of a single basic rectangular waveguide, shown in FIGS. 5a and 5b, for example. This waveguide can be designed according to principles of electromagnetics for 5.8 GHz and can be made of plastic material with a hole for the antenna feed, for example. The inner surfaces of the rectangular cavity can be coated with metal foil or paint, ensuring that the metal is appropriately thicker than the skin depth at the frequency of interest so that the inner surfaces of the rectangular cavity can be reflective. Additionally, if the plastic material used to make the waveguide is essentially transparent at the frequencies of operation, the metal foil or paint can be applied to the outside of the plastic waveguide, which may result in a simpler design. The gain of the resulting antenna can be measured as a function of incident angle and frequency to ensure that the desired performance is achieved.

The antenna can be patterned to form an NED antenna array. The placement of the arrays of speakers and antennas in the n-phonic energy detector are illustrated in images produced from 3D models (i.e., NED embodiments shown in FIGS. 8a-d and FIGS. 16a-c). At each ear, an array of the custom waveguide antennas can be placed in close proximity. Each of the antennas in the array can form an independent energy detection channel. The user (or computer) can interpret the output each of these independent channels. If the computer requires digital signals, a multichannel analog to digital converter (ADC) can be used to convert the raw energy signals at the outputs of the channels into digital signals. After the computer performs its signal processing, a multichannel digital to analog converter (DAC) can be used to produce analog signals for the speaker arrays. When selecting which antenna type can be used in an exemplary NED embodiment, initially a rectangular waveguide was selected. Using simple rectangular waveguide antennas instead of square antennas (square antenna may have feeds to accept both vertical and horizontal linearly polarized signals) can reduce the number of electrical components, for example. In addition, rectangular waveguide antennas are common, which makes it easier to analyze, troubleshoot, and compare the 3D printed antennas with the commercially available antennas. Alternatively, the antennas can be shaped as a circle or a line, for example. Also, parabolic antennas, such as those shown in FIG. 14b, for example, can use one feed per antenna but can still receive both horizontal and vertically polarized signals. These parabolic antennas can have significant advantages over the rectangular antennas, although they can be quite a bit larger than the rectangular antennas when both are designed to target a particular frequency, such as 5.8 GHZ, for example.

However, after investigating a two-dimensional shape patterning on the surface of a sphere, it was found that a square or a circle has symmetry that patterns relatively well on a sphere. In general though, many shapes can be patterned well on a sphere (i.e., Hexagon). Additionally, it may be desirable to receive both the horizontal and vertical polarizations of the RF signals.

Figures 7A, 7B, 7C:
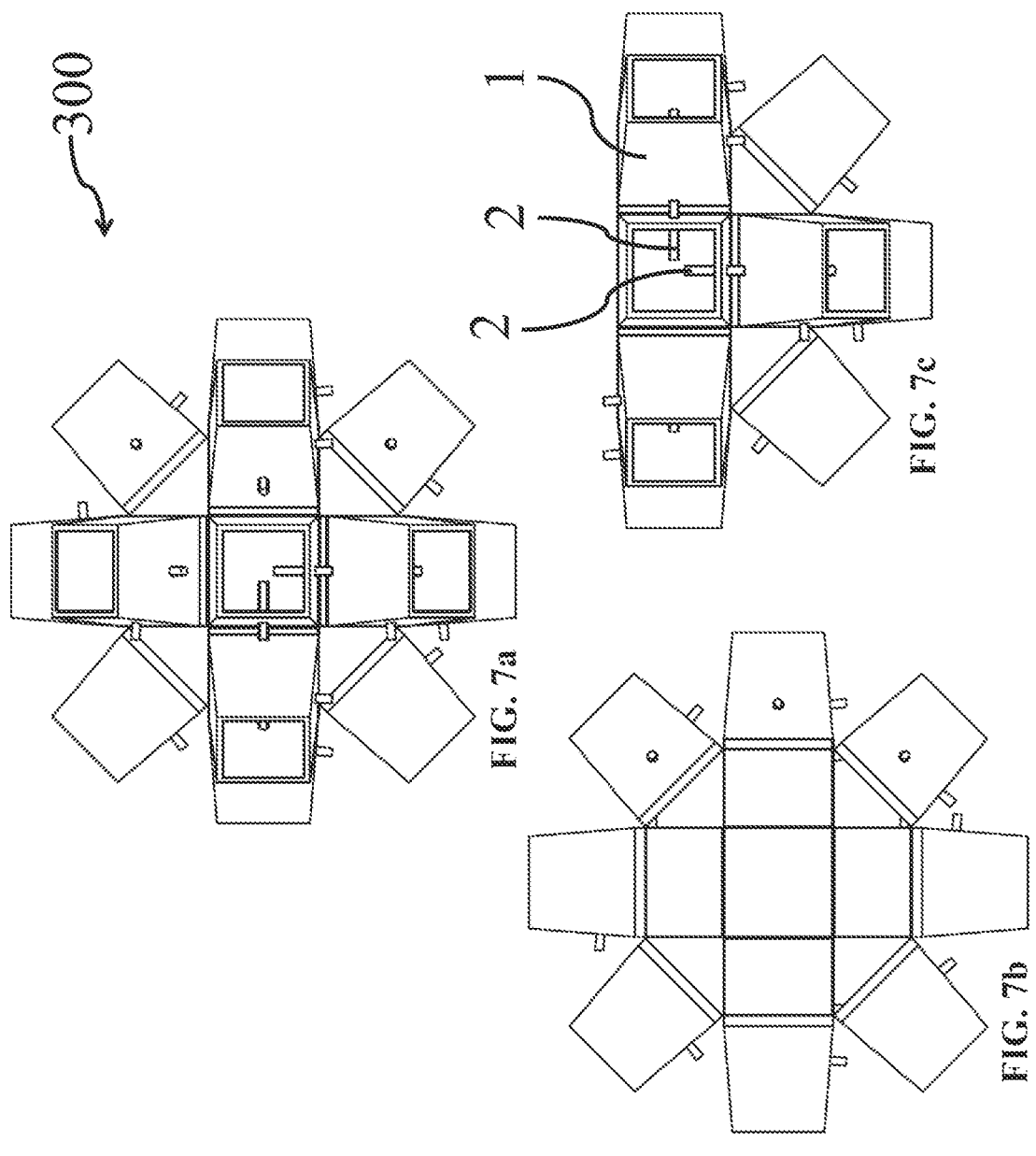

Because transceivers operating around the 5.8 GHZ ISM band are common, this frequency was selected for the NED antenna design shown in FIGS. 7a-c and described herein. Additionally, models for a 24 GHZ and 60 GHZ NED operating in the millimeter-wave frequency range (shown in FIGS. 9a-c and FIGS. 10a-c, respectively) illustrate that antenna size required for a NED would decrease as frequency increases, so more antennas could be used per unit area. With more antennas, the spatial resolution of the NED can increase, although cost to produce it may increase as well.

To put these models in perspective, the diameter of the inner hollow sphere cavity of the designs shown in FIGS. 7a-b can be somewhat larger than the largest dimension of a person's outer ear, allowing adequate space for the arrays of a number "n" speakers and their assemblies to be positioned near the user's ear within the antenna assembly. The location of the "n" speakers can be selected in a way that can be complementary to the antenna locations. For example, if a particular antenna in the antenna array is excited with an RF energy pulse, the speaker corresponding to that antenna (in this case, the nearest speaker directly behind the antenna) can also be excited.

Figures 8A, 8B:
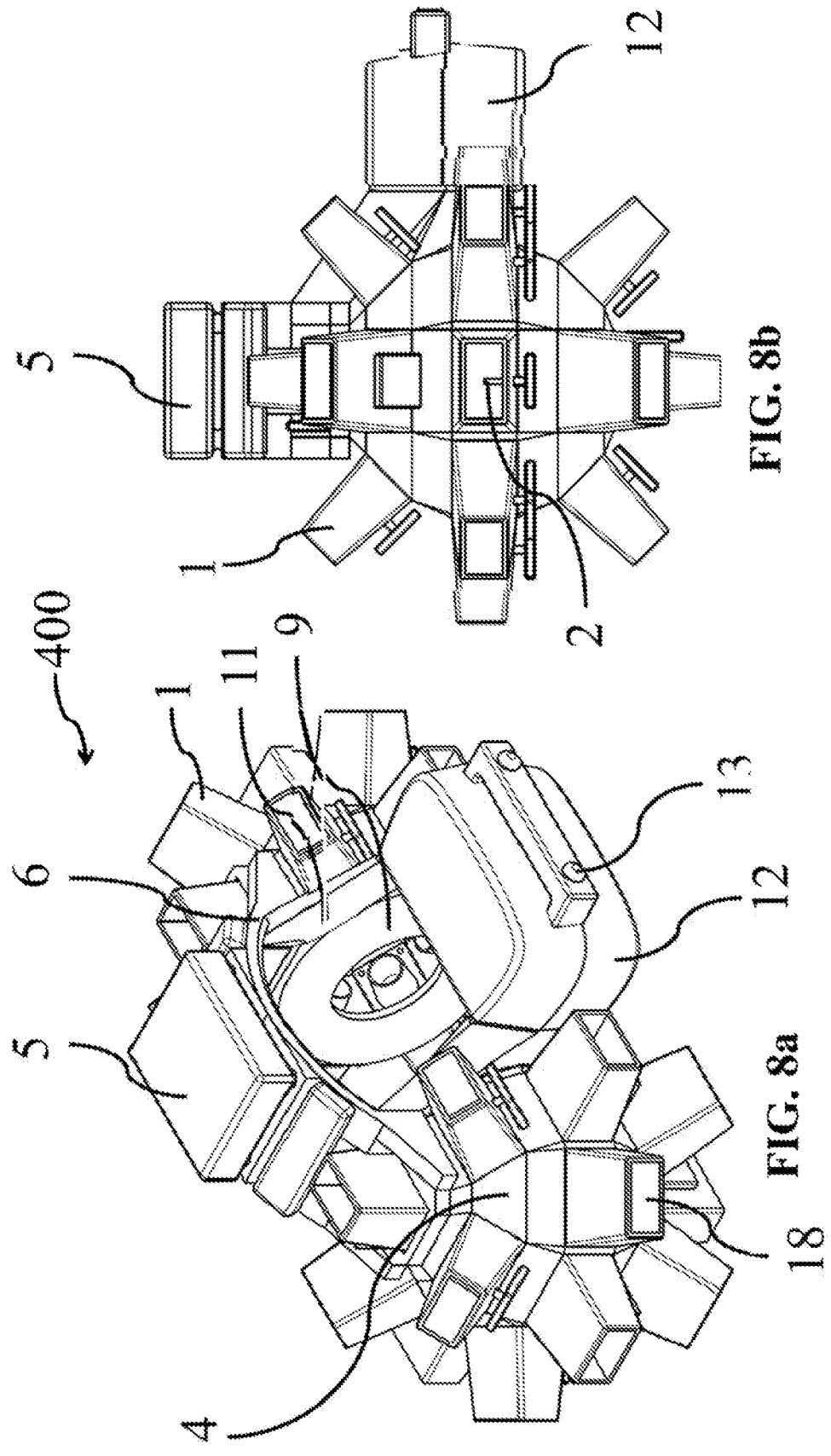
Figures 8C, 8D:
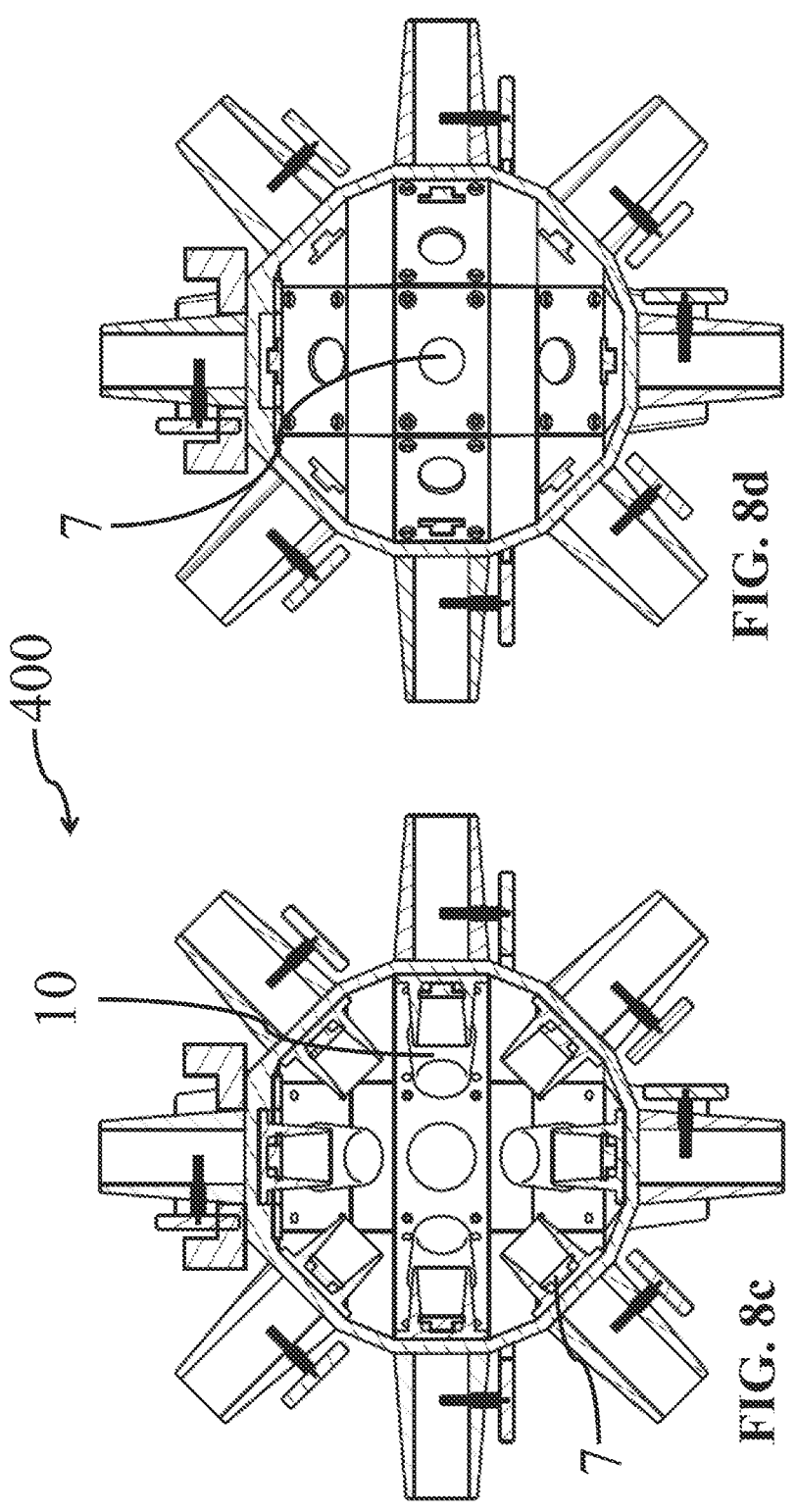
Figure 8E:
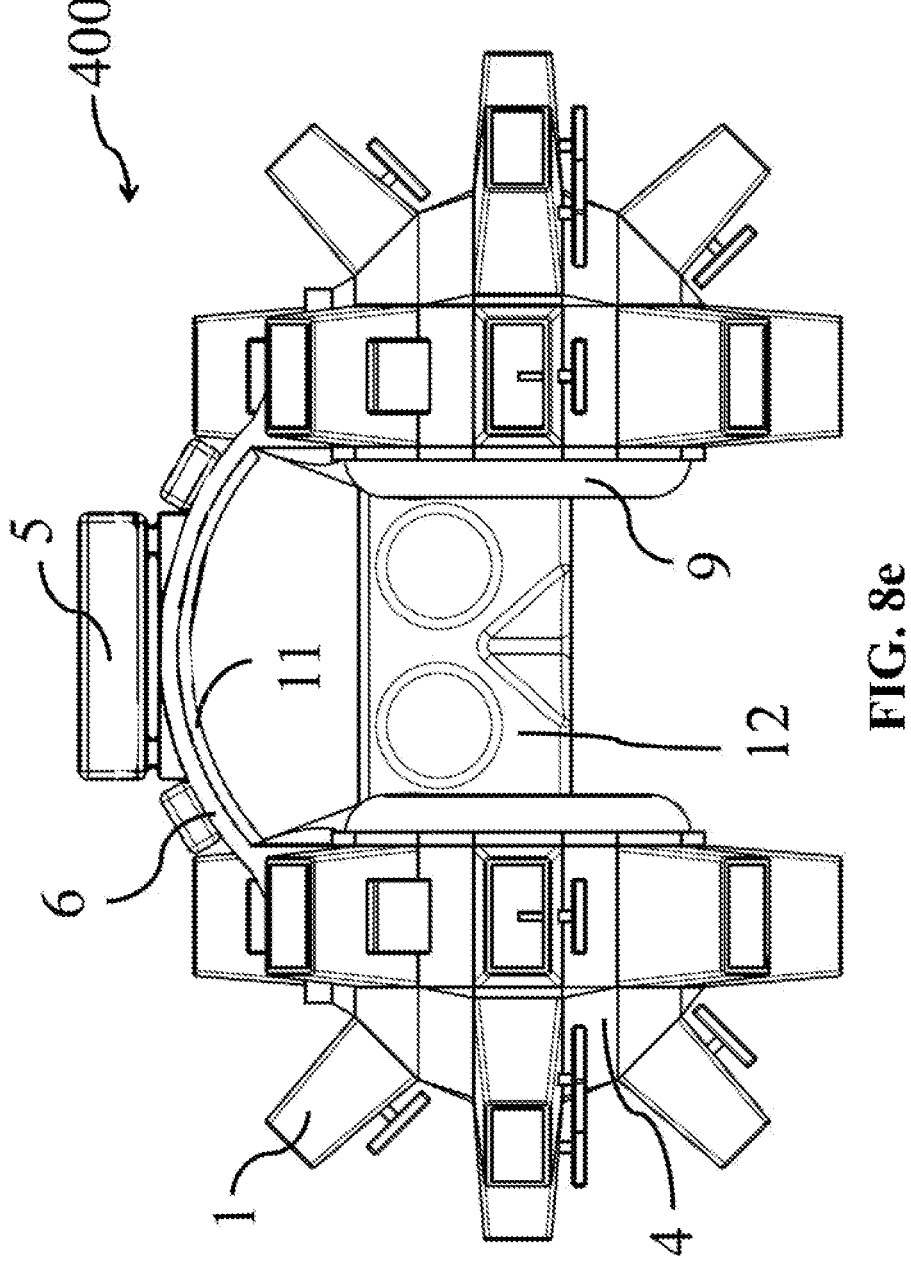

FIGS. 8a-e illustrate an exemplary model of the wearable rectangular waveguide-based NED. The supporting structure 4 has been simplified. For each ear, a half-sphere-like structure 4 can be provided. The two half spheres 4 can be attached together with a headband 6, for example. On the outer surface of the headphones can be mounted the rectangular waveguide antennas 1. The antenna feeds 2 are visible within the antenna cavities. FIGS. 8a-d show the reflective inner surfaces 18 of the waveguide antennas. FIG. 8b shows a side view of the NED. Because the rectangular waveguides are not designed for both vertical and horizontal linearly polarized signals, the strength of the received signal is also dependent on the alignment of the NED antennas with the transmitting antennas. This could be a disadvantage to this design, which can be improved with alternative antenna choices. For example, a NED could be made using parabolic antennas. Additionally, FIG. 8c shows the inner acoustical waveguide tubes 10. The speakers 7 are arranged in the back of the tubes 10. The inner acoustical waveguide tubes 10 can each be used to direct the sound waves produced by a speaker toward the user's ear from a specific direction. FIG. 8d shows the speakers 7 when the acoustical waveguide tubes 10 are removed. The inner acoustical waveguide tubes 10 may not be necessary to produce spatial sound with the n-phonic headphones. Sound absorbing material 19 (shown in FIGS. 12g and 12f, for example) inside the headphone may be desirable to reduce reflections. Additionally, two ear pads 9 (shown in FIGS. 8a and 8e, for example) can be attached to the two half spheres 4 where they can rest against the user's head for added comfort. The headband 6 can also have a soft padding 11 for added comfort. A display system 12 can be used to show the user a visual representation of the RF energy signals as described further below. A camera system 13 can be used by the computer 5 as described further below.

FIGS. 16a-c illustrate an exemplary model of the mountable rectangular NED. FIGS. 15a-c illustrate an exemplary model of the mountable parabolic SED. The mountable SED and NED can be tailored for monitoring applications, and for integration into existing systems on machines, such as self-driving vehicles, for example. An attached speaker and display system may not be necessary in this embodiment. It can be convenient to have a USB connection, or other data connections wired or wireless, so that the NED can be interfaced with. This data connection can be useful in other embodiments of the SED or NED as well, such as the wearable SED and NED as discussed before, and in other embodiments. The data connection can be used to report results from the NED, or give the NED access to remote databases containing known RF signatures that can be used to aid in energy signature comparison and identification, for example. The NED can be connected to an external computer, tablet, phone, etc., that may be configured to use the NED to map its energy surroundings. This wired or wireless interface can be used to report information to a central location, such as a remote server cloud database, for example, in addition to communicating with and sharing information with local devices as necessary. For example, the attached computer on the NED can be connected to WiFi, and can transmit its resulting measurements to a remote computer or a remote display system. It can report resulting information, such as locations, velocities and identified signatures of RF sources. The WiFi connection can interfere with the NED's energy monitoring, unless the NED only transmits information occasionally and does not monitor energy when transmitting. Alternatively, the NED can also determine which WiFi channels it is using for transmission, and implement notch filters on the fly in the energy detector, computer or SDR to suppress this region of the spectrum, so it can continue monitoring other regions of the spectrum with no interference from its own communications. Additionally, the NED and SED can be powered with internal or external batteries or a DC power supply as needed and can include a battery charging circuit.

In certain embodiments of the SED and NED, both wearable and stationary, an Nvidia "Jetson Nano" embedded AI computing device can be used for the computer. The Jetson Nano is capable of running artificial intelligence and machine learning code, and it can be used to learn and recognize signatures. Additionally, software defined radios (SDR's), such as a "Hack RF" made by Great Scott Gadgets, for example, can be used to implement the energy detectors. A "ZED 2" by Stereolabs, or something similar, can be used for the camera system. The SDRs are fully programable and reconfigurable on the fly, so the Jetson Nano computer would be able to dynamically reconfigure the SDRs to target emitters of interest, as well as perform other signal processing. The Jetson Nano and the Hack RF SDRs may only be used for prototyping, and future embodiments may use other devices for the computer, energy detectors, camera system, and other components. Some of the machine learning algorithms could be implemented on the computer or SDRs, and these algorithms and signal processing steps could be dynamically reconfigured on the fly, by the AI system running on the computer, in order to focus on certain signals. Additionally, where antenna switching is used, this antenna switching could be controlled by the computer or SDRs, as directed by the AI that is optimizing which antenna elements are sampled and when.

The energy signals from the SED of NED can be analyzed with the computer running learning algorithms such as those used in artificial intelligence and machine learning, using principles of human sound localization and other signal processing in order to decode spatial information about sources such as device location or device type, localization and identification of sources and device actions in general. Additionally, these learning algorithms can learn the properties of the beams formed with the antennas in the NED and SED, such as antenna beam spread at frequencies of emitters, dispersion of signals, as well as the spatial overlapping of these beams formed with the SED and NED, such that the location of emitters at positions in space can be analyzed with this information in mind. The SED and NED can learn how the specific antennas perform in the arrays and their unique characteristics resulting from manufacturing deviation, as well as physical dissimilarities, in various environments. This type of learning can be used in the SED and NED to increase localization precision and signature detection accuracy.

The attached computer can process the signals from the energy detector channels, and can generate audio signals for the speaker arrays and can generate visual signals for the display system. In addition to sound, the user can see the location of the sources or other data visually. Using an attached display system, such as commercially available virtual reality (VR), augmented reality (AR), or mixed reality (MR) systems, for example, a VR, AR, or MR visual energy experience can be generated for the user. This visual energy experience can be like looking at the raw energy distribution in the environment. The user can see the location and motion of sources, reflections, shadowing, interference, etc. of ambient energy that illuminates the environment. The user can see the motion of energy illuminated objects such as a person walking through WiFi or other RF signal data. This visual energy experience can also be displayed on a screen such as a computer monitor, TV, a small wrist mounted display, or a smart phone, for example. This visual energy experience can aid the user visually, so that the user can move around or walk around in the dark for example, relying on the RF energy vision. In order to produce an augmented reality, or mixed reality experience, a stereo camera system can be used as needed to supply real time visual streams to the displays so the user can see the environment around them, before being augmented with the RF energy distribution in the environment as discussed for the visual energy experience. The camera system may not always be necessary, as display systems become more advanced and become transparent, like Microsoft's "HoloLens 2" for example.

Alternatively, a visual energy experience or a visual virtual environment like a video game can be produced. The NED's computer can calculate the location and type of each RF emitter, and populated a virtual environment with virtual objects representing RF devices, in real time, including routers, phones, cell towers, GPS satellites, Bluetooth devices, laptops, etc. This visual energy experience can be 2D, and look like the floor plan of a building for example, showing the location and type of emitters. It can be 3D, similar to a 3D video game. This visual virtual environment can be displayed on the various screens and display systems mentioned above. The number of antennas in the illustrated embodiments can be arbitrary. The number of antennas per speaker may be a one to one ratio, for example, for simplicity. However, embodiments are not limited thereto and other configurations are possible. For example, in certain embodiments, the number of antennas may not correspond to the number of speakers.

In order to reduce costs, a lower number of energy detection channels can be used, and antenna switching can be used to cycle through the antennas in the antenna array sampling them at a high rate. This antenna switching could be realized with a physical switch matrix, and physical circuits, or the computer or SDR can virtually cycle through antennas to be sampled, if each antenna were connected to an ADC for example. This can result in less energy detection channels required at any given time, and lower overall cost to manufacture, and lower required computational power. However, the trade-off would be that it would take more time to cycle through the array of antennas, and the antennas that are not actively sampled with an energy detection channel are not being sampled, so that data may be lost. The NED's computer can control this switching sequence. For example, if the computer were running learning algorithms, such as machine learning and artificial intelligence based on principles of human sound localization and other signal processing, it could determine that specific signals of interest are received strongest at certain antennas. These antennas, and neighboring antennas could be switched to more frequently than other antennas, so that more information on the emitters of interest could be gathered. As the device being monitored moves to a new location in space, the antenna that receives its signal the strongest might change. The computer could track this target, and appropriately change to sampling the more relevant antennas more frequently.

Additionally, more than one energy detection channel can be used for each antenna. This would require the NEDs computer 5 to have relatively high computational power in order to be able to process these signals. However, by using multiple energy detectors on each antenna, each dynamically tuned to different frequency ranges, the NED can analyze the signatures in RF energy at multiple ranges of frequencies simultaneously.

Other embodiments can include improvements and modifications when building the 5.8 GHZ square waveguide antennas, such as the ones shown in FIGS. 7a-c as more practical designs are created.

The n-phonic headphones used in the n-phonic energy detector can be an independent device. The first n-phonic headphone prototype may not have as "good audio quality" as one would expect from a set of typical stereo headphones. The audio quality can be improved with further embodiments. However, the first challenge and goal of the n-phonic headphones is to have defined spatial sound reproducing characteristics. To this end, one embodiment can include physically small directional speakers. This embodiment can use a tube that acts as an acoustical waveguide for each speaker (e.g., the acoustical waveguides 10 shown in FIG. 8c). The tube 10 can have a speaker 7 at one end and the other end of the tube can be open to direct sound to the user's ear. These speakers can be located at discrete positions around the user's ear (e.g., see speakers 7 and acoustical waveguides 10 shown in FIGS. 8a-d. The position of the output of the acoustical waveguide tubes and the distance between the output of the tubes and the user's ear can be varied, while evaluating the effects on the spatial sound precision of the device. Small speakers without acoustical waveguides can be used in another embodiment of the n-phonic headphones. It may be preferable to use speakers that are directional in the n-phonic headphones. However, arrays of regular speakers that are close to the user's ear can be sufficient or even more effective at reproducing spatial sound.

Another embodiment of the NED operating at 5.8 GHz can use the n-phonic speaker-holding acoustical structure 4 shown in FIGS. 11a-c. In this embodiment, speakers from small "In-ear Earbuds", as they are commonly referred to, can be inserted into the acoustical waveguide tubes from the outside of the hemispherically shaped acoustical structure 4. The sound from these speakers will be directed through the tubes and finally at the user's ear within the hemispherically shaped acoustical structure 4. To reduce acoustical reflections within the n-phonic headphones, sound absorbing material may be used between and around the acoustical waveguide tubes inside of the hemispherically shaped acoustical structure. The outer radius of the approximately hemispherical speaker-holding structure 4 shown in FIGS. 11a-c can be selected such that it can be inserted into the cavity of the 5.8 GHZ NED shown in FIG. 7b with a gap between the two for the speakers.

The full assembly of another embodiment of the 5.8 GHZ NED can include two copies of the square waveguide antenna structure shown in FIGS. 7a-c, one for each ear. The speakers 7 and acoustical waveguides tubes 10 can be configured similar to the rectangular 5.8 GHz embodiment shown in FIGS. 8a-d, for example. Alternatively, the speaker holding structure shown in FIGS. 11a-c can be used instead. RF absorbing foam may be used on the outer most surface, between the antenna elements of the antenna structure, if desired to reduce reflections. After the two sides are assembled, they can be attached to a padded band so that the NED can be worn on the user's head like traditional over-the-ear headphones similar to the embodiment shown in FIGS. 8a-d.

In certain embodiments, spatial audio recordings can be made with n-phonic microphones. Such device can use the complementary n-phonic microphones to record digital spatial audio files that can be played back through the n-phonic headphones when testing. An exemplary wearable version of the n-phonic microphones may use the acoustical waveguide holding structure shown in FIGS. 10a-c, except that microphones can be attached at the end of the tubes from within the hemisphere (e.g., the end where the user's ear is located) with the tubes open at the other end. This n-phonic microphone device can be worn like a pair of over-the-ear headphones for audio recordings from the user's sound perspective.

Spatial sound recordings and a video recorded from a person's perspective can serve as a demonstration for an individual who is testing the n-phonic spatial audio devices for the first time.

For the speakers used in the NED, directional speakers can improve the operation of the device. Typically, speakers are relatively omnidirectional. The speakers 7 shown in FIGS. 12a-b were used while experimenting with various acoustical cavities 10, including but not limited to the ones shown in FIGS. 12c-h, for example. Typically, the speakers 7 are circular. However, rectangular varieties are also common. In FIGS. 12d-f, the speakers 7 are arranged in the back of the acoustical cavities 10. FIG. 12a shows a front view of a circular speaker 7. FIG. 12b shows a cross sectional side view of a circular speaker 7. FIG. 12c is a front view of a rectangular speaker 7 arranged in the back of a rectangular cavity 10. The rectangular cavity can be acoustically reflective. FIG. 12d is a side view of the acoustically reflective rectangular cavity shown in FIG. 12c. FIG. 12e is a front view of a circular speaker in an acoustically reflective cavity. FIG. 12f is a side view of a circular speaker in an acoustically reflective cavity. FIG. 12g-12h are somewhat different. They illustrate a circular cavity made of an acoustically absorbing material 19, such as foam, for example. This configuration may be desirable because it can cut back on unwanted acoustical reflections within the headphones and not distort the frequency response of the speakers, like reflective cavities may contribute. A rectangular absorbing cavity can be made similarly. The illustrations in FIG. 12a-12h serve as examples only, and other speaker types, and structural configurations are possible to create directional speakers.

An exemplary wearable rectangular waveguide antenna based SED is shown in FIGS. 13a-d. An exemplary wearable parabolic waveguide based SED is shown in FIGS. 14a-d. Because there is only one speaker 7 for each ear in these wearable SEDs, acoustical waveguides (currently not shown) would likely be redundant. Acoustically absorbing material (currently not shown) inside of the headphone may be applied to reduce reflections. Additionally, two ear pads 9 (shown in FIGS. 14*a* and 14*c*) can be attached to the two half spheres 4 where they can rest against the user's head for added comfort. The headband 6 can also have soft padding (currently not shown) for added comfort.

It may be desirable for the antennas in the SED to have a wider beam width than the antennas in the NED. It may further be desirable for each of the antennas in the NED to have a relatively tight beam width, possibly with a little overlap with neighboring antenna sectors.

The speaker arrays in the NED have the potential to produce high quality spatial sound. Spatial sound headphones that can be used to listen to music or more realistically experience sound in virtual reality may be achieved by using an n-phonic microphone array that complements the n-phonic headphones.

The human mind can begin to learn the unique tones and audible energy patterns from devices, such as routers, laptops, cell phones, and Bluetooth devices. In addition to the unique energy patterns or energy signatures, which allow one to recognize devices, device actions can also be known. Smart phone applications when opened and closed a number of times, were found to produce a unique energy signature corresponding to the action of opening or closing the app. Each action on a smart phone that results in an RF transmission, such as watching a random YouTube video, for example, has a unique energy signature that can be learned. For example, although it might not be practical to determine which video a person is watching (although this may be possible with energy signatures), it can be determined that the user is watching a video on YouTube as opposed to on another website. Even the action of locking or unlocking the smart phone produces unique signatures as the radios are enabled and establish connection.

When spending some time outside, it is easy to spot a few people playing the video game "Pokémon Go." It is known visually when someone is catching a Pokémon, because the player sometimes wanders off the sidewalk and into the grass, stops for a second (while having a battle against the Pokemon) and then tries to catch it. After catching the Pokémon, the player begins walking back to the sidewalk and proceeds on his/her way. With the SED equipped, a person can actually experience what it sounds like when someone catches a Pokémon. Similarly, actions such as talking on the phone and receiving text messages have unique patterns in their energy signals.

Using the SED to learn energy signatures is similar to learning the words of machines in their language. When people program computers, they teach them how to communicate in a way that fits as much "data" as possible into every packet, in a structured way. Consequently, there are patterns in how these machines talk. People know a robin or a sparrow by the way these birds sound. Yet, if attention is paid, each chirp is different from the previous chirp. However, there is a pattern, significant in their chirping. Birds have been part of our lives for so long that we can easily learn new birds by their sounds. Our human brains can do the same with machines. Consequently, using artificial intelligence and machine learning, a computer can be used to automate this process, implementing classification and identification using concepts such as natural language processing, to implement machine language processing, in addition to using localization algorithms and other signal processing to implement principles of human sound localization.

The MED was a proof of concept verifying that the energy detection devices will produce audible tones, as this was the original goal. With the SED, RF energy localization paired with signatures in energy signals has been perceived. If RF emitting devices are located within the SED's range, the device type, actions, and location of each device is perceivable. In general, a computer may analyze the output of the MED, SED, or NED and may be able to analyze a wider range of frequencies, taking into account more of the information contained in the energy signal. The SED is constrained to two-dimensional energy localization if the device and the user are stationary. However, if the user moves his/her head, he/she may be able to deduce its location in three dimensions with this real time feedback. Since each RF signal is spatially orthogonal, the human mind can pick out each unique source and begin to learn patterns in the energy signals.

In order for a relatively stationary energy detection device to be able to perceive the location of an energy source in three dimensions, an n-phonic energy detector (NED) will be required. A prototype of this device, consisting of a number "n" energy detectors, where $1 \leq n < \infty$, will be developed eventually.

The MED, SED and NED described herein may have the following applications:

The MED, SED or NED may have military applications. For example, a soldier may be able to tell if there are people or devices in a building before entering it. With the SED or NED, a user can locate and identify devices emitting in the area of the user, through walls and other materials depending on the observed frequency. For example, if a solder is asked to make sure an abandoned building is actually abandoned and not an enemy hideout, the SED or NED could be used to determine the presence of cellular phones or other wireless devices, which would suggest that there may be people hiding inside the building. If the signals are not an energy signature unique to enemy military equipment, at least the exploring soldier could become aware of potential threats and their general locations. In addition, improvised explosive devices (IEDs) can be triggered by a wireless radio signal or mobile phone. These wireless signals can be monitored by an appropriate SED or NED and the soldier could potentially be aware of some IEDs. With learning algorithms, a computer attached to the SED or NED can potentially identify the device and device's actions, relaying only pertinent information to the soldier.

Cellular phone companies can benefit from an SED tuned for their applications. A company trying to troubleshoot an area that has poor service during peak hours can use the SED in the field in order to become aware of not only specific areas with poor reception, but can also determine why this might be the case. For example, a building or a structure may be shadowing an area. This can be experienced, and a practical sense of its severity can be considered. In addition, interference due to LOS and reflection off a building, as illustrated in FIG. 3, can also be considered by isolating the LOS from reflections. These new perceptions with the SED may provide a technician with the knowledge and the ability to select the most suitable location for the RF source antenna. Additionally, a SED could be attached to a drone, and flown up the side of a cellphone tower, to map out the RF beams of the transmissions, find faulty antennas or damaged cables. The SED could be a useful tool that could save time and money that is spent troubleshooting cellphone tower problems.

Companies that set up and troubleshoot Wi-Fi systems can also be interested in the SED. While positioning routers, technicians can wear the SED and ensure that the signal reaches all the nooks and crannies of the building with minimal effort. All they have to do is connect their phone to the Wi-Fi system and perform a test similar to an internet speed test. They can then walk around and listen to which routers they connect to, making sure there are no shadowed areas. In addition, technicians can monitor the digital coding scheme in use by the phone and determine whether to place more routers to increase performance in desired locations. Additionally, during peak hours they could come back to the site to check for interference. If there is interference, the SED can be used while re-adjusting the locations of the routers slightly so that they contribute to constructive interference, as opposed to an uncalibrated system that may or may not be constructive. It is worth noting that today, if someone suspects that the system is experiencing destructive interference in an area, the fix is to "move the router a little". However, this movement is done relatively blindly. When many sources (routers) are present in a building, even if one source is moved a little to contribute to constructive interference in an area, an adjacent router may begin interfering destructively in a different area. With the SED, these effects can be noticed in real time and taken into consideration. A complex Wi-Fi system can be tuned with the SED, and practical intuition can be gained by the wireless system technicians.

A MED could be used to test coaxial cable ports in modems, set top boxes, and really anything that outputs RF energy from a port. In this case, an antenna may not be necessary, the coaxial cable can be connected directly into the energy detector. It might be handy to use the MED to test these ports, instead of using a big and expensive piece of hardware.

Firefighting can also benefit from the SED. In the event of a fire, a trapped person can set his/her phone to "panic" mode. With a little cooperation with the mobile OS companies, this panic mode can emit a unique wireless signal at the full transmission power of the device. Firefighters equipped with SEDs can locate trapped victims as the emitted wireless signals propagate through walls and other objects. For example, a firefighter, with a slight jostle of the head, can tell if the trapped person is up or down, left or right, and go straight to them. Once equipped, the SED can be hands-free and its audio could be superimposed or augmented to the firefighters' normal audio. Additionally, the NED's computer can process the signals from the energy detectors, using machine learning, artificial intelligence, principles of human sound localization, and other signal processing. In addition to learning and locating devices of interest, such as cell phones someone may be carrying, the NED will be able to monitor the location of team members by locating and tracking their wireless radios or wireless devices. In addition, an visual energy experience can be produced by using a computer, that can be fed into a display system. The display system could be a virtual reality style display, augmented reality style display, or mixed reality style display, for example, although other display styles are possible as previously discussed. This visual energy experience could consist, simply, of markers, placed at the appropriate positions in space in a mixed reality experience, for example. So the firefighter knows where his team members are located, and the locations of other people. Additionally, if the resolution and sensitivity of the NED system is high enough, the attached computer could produce a visual energy experience representing the energy illuminating the environment, showing reflections, transmission, shadowing, interference, scattering, refraction and other effects, that naturally occurring as the energy interacts with objects and the environment. For example, if the SED or NED were designed to operate in the millimeter-wave range [approximately 30 GHz to 300 GHz] the antenna size of the SED or NED would decrease significantly, so more could be used per unit area. Additionally, once the $5^{th}$ generation of wireless communications (commonly referred to as 5G) begins to take effect, our cell phones will be capable of producing much higher frequencies for transmission (for example, currently 5G new radio (5G NR) will use 24.25 GHZ and 52.6 GHz). Once these 5G devices and base stations are illuminating the environment, the NED's resolution of this visual representation of the energy signals illuminating the environment will increase significantly, revealing spatial features at length scale on the order of centimeters, or millimeters. In addition, it was found that human skin emits electromagnetic signatures in the millimeter wave range, from 80 to 100 GHz. Also, throughout research, the present inventor has found that the ambient environment is either being illuminated by natural millimeter wave energy, from the sun or atmosphere, or environmental objects are passively radiating millimeter wave energy, similar to how objects radiate thermal energy. In either case, the environment appears to be naturally illuminated in the millimeter-wave range, which could be imaged with the NED as discussed here. A user wearing a NED with a display system can see through smoke, see through walls, and see objects in the environment that are illuminated by ambient energy, in addition to seeing sources of energy directly.

A call to 911 can be set to automatically enable this panic mode of the phone. When someone calls 911 for medical help, the ambulance crew can equip an SED and rush onto the property. This could help bring medical attention to people faster in situations that might be time-critical. The following is a true story. Someone called 911 and a police officer came to the general GPS location. He went to the closest home to ask the homeowner if they had called 911 because the person who had called 911 said nothing. No one had called 911 in that home. The officer looked around outside in the dead of night with a flashlight for skid marks on the road and gravel, searched the woods nearby and found nothing, so he went back to the department. Three days later, a father arrived at the location in search of his missing son who had not returned after work. This father was a retired police officer and saw something suspicious that may have been caused by a car going off the road. The son had fallen asleep at the wheel and went off into the woods, down in a creek. The officer at the location found no skid marks because there was no attempt to stop. If the son's phone had been in a panic mode and the first officer had an SED, the son might have been located quickly.

The SED can help someone who was kidnapped or is in a hostage situation. If the person calls 911 and the panic RF mode is enabled, the authorities once on the scene using the GPS location, would be able to use the SED to locate and track the person inside a building and plan accordingly.

Police officers with vehicles equipped with NEDs with a BPF allowing for detection of cellular phone signals could sit by a highway, for example, and monitor the passing vehicles to check for people texting and driving, using apps, and which app is used. Also, the SED interpreted by a computer can use these signals to track the location of the RF energy source over a period of time to quickly report the speed of the vehicle, and acceleration potentially if this is of interest, near the time of these events. The NED can simultaneously monitor all vehicles passing in both directions in principle, and can report this information for each vehicle that causes an energy event. If a SED or NED were used tuned for the millimeter wave range, the speed and location of vehicles can be tracked using the ambient energy that is illuminating the environment, in addition to tracking energy signals from emitters of devices in the vehicles.

Routers equipped with SED or NED modules in a popular place, such as a mall, can serve a number of purposes. At this point in time, signatures in RF energy signals allow one to know which apps people are using, and with which devices. It was realized that app designers want their apps to be easily distinguishable and would add more unique signatures, allowing apps to have more advanced features. Additionally, cellular phone manufacturers would probably like to gather data, and would want to add unique user identification signatures. For example, an app designer wants to add this unique signature for the app's users. Let's assume Snapchat is the company that wants to add this to its app. Today, Google Maps is great. If you wanted to meet your friends at the mall, finding the mall on Google Maps would bring you to your general destination. Your friends are not located in the parking lot, where Google Maps drops you off, however. Let's assume that the person and his/her friends are all on Snapchat. Today, you could pull up "Snap map" and it would show your friends as a dot on a global map. However, a global map is not necessarily helpful when entering a mall. Now assume the mall is equipped with routers having SED or NED modules. These SED or NED modules will have located the person's friends much more precisely, and may update their locations much more rapidly. What is the advantage of this? Over time, Snapchat can gather the precise location data for its users, and by plotting all of the positions that users have been onto a map, the user can get the practical floorplan of the mall, including permanent objects and temporary ones. The map can be dynamically redrawn. The user can even map out stairs and multi-floor, multi-level buildings. Now, the SED or NED can put the location of your friends on a three dimensional map. In addition, the location tracking of each user will assist in real-time human dynamic motion prediction. For example, the user walking data can be categorized in terms of the type of place they are walking. The way people walk around malls is quite different from how people walk in grocery stores. This data can be valuable for real-time prediction algorithm.

Blind people can also benefit from augmented RF hearing with the SED. Blind people can use the SED in order to assist them in their awareness. They may even enjoy this awareness. Blind people learn from their surroundings by sound and feeling. For example, as a blind person walks down a city street, he/she hears the beeping of the street cross crosswalk. This allows blind people to know where they are more precisely. A blind person wearing a SED, or eventually a NED, could hear the routers in each business as they walk by. Each business would sound unique because their routers are each a little different, set up in different places, with different environmental objects to reflect, shadow, and produce unique interference effects that could be recognized by a blind person. The SED would not replace normal hearing in this case necessarily, but normal hearing could be augmented by SED. Similarly, machines of various types would benefit from this RF perception using the SED or NED. For example, a machine such as a self-driving vehicle, drone, airplane, ship, submarine, etc., could use the ambient RF signals from cell phone towers, routers, and satellites in order to know where they are more precisely using the SED or NED, in addition to being able to track and monitor the emitters themselves if interested.

Dirty electricity can be detected and sources can be located using the SED or NED. For example, florescent lights can be a source of dirty electricity. When there is dirty electricity present in the house, the user can experience it with the SED or NED. If the dirty electricity is really bad in the home, the user may have trouble finding the source, since all the wires in the home act like antennas. Once the user is pretty sure the source of dirty electricity has been located with the SED or NED, the user can unplug or turn off the device, and make sure that the radio frequency interference RFI that the user experienced with the SED or NED has been eliminated.

Security systems can be set up using the MED, SED or NED. Such security systems could be used in prisons, and nursing homes, for example. A person can have an RF emitter attached to the leg. On the outside of the building, MEDs, SEDs, or NEDs could be mounted periodically to set up a perimeter. If a resident or a prisoner attempted to escape, once they left the building, the energy detection device would detect their unique RF energy signal and would help security locate them. The SED or NED could be incorporated into a traditional security system. By using the SED or NED, the security system could now monitor the electronic devices that a person carries, and use these unique device signatures either from apps or specific device signatures unique to the model of phone, model of smart watch, or other electrical signatures for additional "fingerprints" of the individual, to validate identity of this person. Security systems using the NED would not need a 3D visual RF energy experience. After talking to nurses and directors at nursing homes, it was determined that a 2D virtual floor plan at each nurse's station that shows the location of each resident in the facility would be fantastic for them. Each resident could have a necklace, or some other emitter, that serves as a traditional wander guard, locking doors as they walk by if they are not permitted to exit, but in addition, the RF signals from the necklace or device can be tracked real time. Certain permissions can be assigned to the residents using the monitoring system at the nurse's station. For example, a resident can be instructed to stay in his/her room if that is necessary, and the NED system can be informed of this instruction. If the resident decides to disobey, his/her point on the 2D floor plan at the nurse's station can change colors, make some sound indication, and the nurse can be notified of it. Knowing where residents are, and where they are headed on the 2D map, could help nurses.

The SED or NED can be used to make an anti-cheating device that teachers and professors can use when they are giving a test. The user can sit the SED or NED at a desk in the front of the class, it is able to recognize cellphone activity, and locate where the event took place. To notify the teacher, the device could have a half-circle ring of light emitting diodes (LEDs) indicating the direction the event took place. This half circle ring of LEDs could have three or so LEDs in a row, indicating distance. The device may need AI integration to recognize cell phone activity and decide that an event took place, constituting cheating. The LED array would let the user, in this case the teacher or professor, have the last say in determining if a student cheated. They could look in the direction of the event and see if they catch the cheater in action, and then they can take it from there. This anti cheating device will catch students who use their phones during a test to send answers to other students. The AI will be able to determine who sent an answer and who received it in the classroom due to the unique energy signature resulting from end to end encryption of the message, and the delay between the user who sent the message and the recipient. Additionally, this device will recognize cell phone activity in general where it is not permitted.

The mountable version of the MED SED or NED, for secure facilities and government labs for example, can be hung on the wall. The SED or NED is able to recognize cellphone activity, or any other activities on devices that are not permitted (such as Bluetooth devices, etc.). When the SED or NED recognizes this activity, it sounds an audible alarm, if desired, and maybe even a visual alarm indication such as a flashing sign saying "cellphone activity detected" and the location of the offender can be tracked real time until the situation is taken care of. This alert can be a visual indication, so the offenders are aware they are about to get in trouble. Usually, monitoring and security systems are silent, so it might be more practical to make a silent monitoring device that is sort of like a security camera except it monitors and locates cellphone, wireless, and other electronic activity, discretely notifying security so they can act on it and catch the offender by surprise. This silent monitoring system can be hung in the corner of a room like traditional security cameras. For now, the frequencies our devices emit are relatively low, such as 2.4 Ghz to 5.8 Ghz typically. At this frequency range, directional antennas that are roughly the size of a person's first (or a little smaller) may be needed, so this silent monitoring system may appear bulky, but as common cellphone and wireless device frequencies increase, the antenna size necessary for the SED or NED will decrease and the silent monitoring system will get smaller and less bulky, more discrete and easier to hide if that is desirable. Casinos may also need something similar to this device, to make sure that people do not use their phones or wireless devices to cheat at the slot machines.

Soldiers in the field could use a NED to set up a monitored camp. Imagine that a group of soldiers is hiking through the desert, in enemy territory. They want to set up camp for the night. If they had a NED with attached computer, the computer could learn the signatures of emitting devices. Let's assume the NED is tuned such that it detects all the wireless signals that soldiers of both sides may have. Now, the NED computer can initially tell that the "friendly" soldiers are close upon power up. Once the NED computer has learned the RF signatures coming from close friendly soldiers periodically, it can monitor their locations. In addition the NED computer can be aware of ambient RF, such as a nearby cellular phone tower. Any new wireless signal that approaches the camp can be located and the friendly troops can be notified in case that it might be an approaching enemy.

The SED or NED can be used to collect data about the devices in the area. Statistics, such as the duration/time that users are using particular apps, can be collected. Data regarding the types of devices in the area can be gathered in real time. For example, it could be known that there are three iPhones, a microwave oven, and two Samsung smart phones present within a range. In addition, the location in space of these devices could be more accurately calculated with the SED or NED. Things, such as the number of calls in a day and the number of text messages sent in a day within the area, can also be counted.

Drones could have a NEDs attached to them, and these NEDs could localize RF energy and monitor energy signatures from each device within a range in its accepting bandwidth simultaneously. A computer that analyzes the signals of the NED could focus on one device, and can effectively ignore the rest of the devices that are spatially orthogonal. In addition, drones could be aware of their environment by learning the locations of RF energy sources. The drone could use this knowledge to potentially "find its way home." Conversely, drones can be tracked and monitored with a NED since drones rely heavily on wireless communications (i.e., they are controlled remotely and stream video sometimes).

Augmented reality apps for smart phones and other devices can become quite interesting thanks to the RF energy localization and energy signature data provided to the user by the SED or NED.

Augmented reality games with new features can be possible with the SED or NED. A person could play augmented reality laser tag. An augmented reality headset with NED could be used to see who is playing the game (maybe they have a hovering symbol by/on them). People who are playing have the app up, which emits a unique signature. The NED will track players' locations and may augment them visually with a virtual gun, armor, etc. Their augmented reality headset would have an emitter with a unique signature. The players' cell phone could be used as a "beam shooter." By "looking down your sights" holding your phone and making line of sight from your eye, to your phone, and to the enemy player, the NED can calculate the ray that may potentially strike the enemy. Now, by tapping the trigger, the player can fire and if the bullet strikes the collider augmented to the players within the game engine, then the enemy is hit.

The NED can offer significant advantages over the video image processing technology that is currently employed in virtual reality (VR) systems, such as the PlayStation VR. The NED can be much cheaper than the camera system used in these systems. Image processing is slow and computationally intensive. A couple calculations with a microcontroller on the NED can be much faster. Currently, some components of the PlayStation VR system consist of a stereoscopic camera facing the player, lights of varying colors on the player's headset, and two hand controllers. The stereo camera system can measure depth, and so the PlayStation processes the location of the controllers and the headset frame by frame. With the NED, the system could be as follows: The stereoscopic camera is replaced with one or more emitting Wi-Fi antennas, each with a known signature. Each controller has an antenna emitting a unique signature. On the headset, there is a NED system inside. The user/player is no longer bound to stand within the view of a camera. As long as the user is in the general area of the stationary emitters, the NED can track it. The NED can calculate the location of each of these emitters relative to the user. This calculation can be much faster than image processing. Movement in VR can be more responsive and cost can be reduced. In addition, 3D sound in VR can be more responsive as the player rotates or tilts his/her head.

Using a SED or NED, paired with a directional RF emitter operating within the BW of the SED or NED, a person may be able to tell by listening if objects are nearby, and where they are approximately by the reflected signal. This may allow people to have additional awareness in the dark. It may be possible to approximate the bulk material an object is made of. For example, if a person is in the military and has to clear a building. In addition to listening for hiding people with emitting devices using the SED or NED, the person can use a hand-held directional emitter to "sweep" objects, such as like doors and walls, to search for anomalies, such as a strange metal reflection from something attached to a wooden door on the other side in a suspicious location (maybe a bomb). Additionally, if there are people walking around in the room just beyond the door, by listening to the reflected energy, a person may be able to detect motion of the walking people within. They may have some metal objects on them. The person still may be able to hear the movement of dielectric flesh, as people walk around by sitting still and listening. In addition, a NED using a computer and display system to view the ambient RF energy as described before could be beneficial in this application. Although this application is similar to traditional active RADAR, this new method has some significant advantages. Active RADAR traditionally assumes that the pulse transmitted is known, and it is precisely controlled, so that the receiver can observe the changes in this received pulse and deduce information from the environment, such as object location. However, in this example, the NED is just observing the energy in the environment, while a directional emitter held by the user can be moved freely around. If the user points the emitter in front of him, some distance from the door, he will see the RF energy reflect off of the door and back into the room he is in, and would probably not be able to see through the door very well. However, if he presses this emitter directly against the door, the RF energy can be directed through the door, penetrating into the adjacent room, and illuminating the environment within. The user could now see through the door, and see objects illuminated by his source of RF energy within the adjacent room, in addition to seeing RF sources that may already be presently emitting and illuminating rooms within.

Similar to the previous example, using the NED with a hand-held RF emitter, it may also be beneficial to have an RF emitting ball that can be tossed in rooms and through windows as needed to illuminate the environment with energy. The wearable NED with display could produce a visual experience for the user as described before, to see in this RF illuminated environment. Imagine a firefighting scenario. If the home is on fire, the electric may be off and there may not be many RF emitters present to illuminate the environment. The home's WiFi router may be damaged or un-powered in the burning home. These RF balls could be tossed through some windows of the home prior to entering, and the firefighters could carry more, to toss in rooms as they go. These RF balls will illuminate the environment, so firefighters can see objects such as couch, tables, chairs, etc. and they can serve as waypoints for the firefighters. These RF balls could be used to indicate rooms and areas that the team has already searched. The team can use them to find their way out of the home, and maneuver around objects that they may not be able to see with all the smoke if they only relied on their natural unaided sense of sight. A NED thrown into orbit around earth may be useful. This NED can look for energy signatures in space and track them real time. It can learn signatures from other satellites and emitters all around earth, such as dish antennas on the surface. If missiles communicate wirelessly to a station on the surface of earth or a satellite, a missile launch may be detected and the missile may be tracked real time. In addition, a NED in orbit could track the location of energy events, such as RF pulses from lightning in the atmosphere. The present inventor has found by research that these RF pulses from lightning initially propagate away from earth, but actually reflect off the inside of earth's magnetic field and reflect back and forth around earth within its magnetic field. These are called whistler mode plasma waves. As these RF pulses propagate, they experience dispersion. The NED can localize these RF energy pulses, tracking and tracing their path in real time, and monitoring dispersion of the pulses as they propagate. In addition, by monitoring many pulses and mapping out reflections, a visualization can be produced to visualize earth's magnetic field. There are other types of plasma waves that could possibly be monitored with the NED as well.

Smart houses may be revolutionized with a SED or NED. For example, a small house or apartment may be equipped with a NED relatively central. When the house owner returns, the NED can recognize the signature and location of the owner's phone, so the door they approach is unlocked for them. When the person walks in, the NED knows their location so nearby lights turn on as the persons enters. As the person walks from room to room, the smart house can automatically turn on lights, and turns off others appropriately. All other smart house features could exploit this position data if it would be beneficial.

Light bulbs with a small, basic MED module inside can be programmed to automatically turn on when someone walks within range of the antenna with a cell phone or other emitter in their pocket. When this person walks out of range, the light could then turn off again with a little delay. These days, most everyone carries a cell phone around all day so this could be quite a convenient energy saving solution that is as simple as changing a light bulb.

Life will be different with the SED or NED and a puck emitting a unique RF energy signature. The puck may have one or more antennas, located a distance apart, each antenna emitting a unique energy signature. A novel augmented reality experience is now possible. The puck can be placed on a table for example. The SED or NED in the user's augmented reality helmet can track the location of the puck in real time, relative to the user. A virtual object, such as a 3D model of a car, can be bound to the puck. If the user decides to walk around in the room, the 3D model can stay where it was placed in space. The user could further interact with the model. This augmented reality experience is quite enabling. This idea can make computer monitors and possibly TVs eventually obsolete. All a person would need would be an augmented reality helmet and the person could bind a virtual screen or TV to a puck in augmented reality. A person could have a 32 inch TV, a 100 inch TV or choose anything in-between. One's house can be completely empty of objects. With augmented reality, the SED, and some pucks, people can fill their houses with any virtual object they want, and the location of these objects can be tracked relative to the user's SED or NED. It is worth noting that an object once attached to a puck can be displaced relative to the puck, and it should stay there intact. Multiple objects can be bound to one puck. Certainly the market of physical objects will be eventually affected by a movement toward a virtual world. People could have an Amazon bookshelf that not only holds their purchased e-books, but can also advertise new books to the people each day in their living rooms.

In an airplane, we are told to put our phones and electronic devices in "airplane mode." This mode ensures that our phones' wireless transmissions do not interfere with the radios in the plane used for communications and other important purposes. Although we are told to do this, some people may forget to turn off auxiliary devices, such as their smart watch, FitBit, PlayStation portable (PSP), and Nintendo DS, to name a few. Children may especially be unaware of the wireless radios in their game systems. The SED or NED can provide flight attendants with the ability to simply walk up and down the aisles and check for emitting devices. With the SED, in general it is very simple to find an emitting device. However, the following issue may cause energy localization with the SED or NED in an airplane to be a little more complex. Consider the following realization relating to the metal elevator. When walking into a Faraday cage with a device transmitting and the SED equipped, you realize the wireless devices maximize transmission power attempting to get its "word" out. A metal airplane cavity is similar to a metal elevator, in principle. If only one cell phone in an airplane was not on airplane mode, the standing wave interference nodes and antinodes perceived with the SED from this device and its reflections would be disconcerting to someone who was not expecting it, or at least aware of it in principle. With more emitting devices in the airplane, this could be a challenging situation. The successful use of the SED or NED to locate RF sources in this application will need to be verified, although in principle it is possible. A simpler solution, would be to install MEDs above each seat, directed down on each passenger, or groups of passengers. This MED could have a relatively short range in order to limit its monitoring capabilities to the one seat, or a few neighboring seats. If there are any wireless transmissions, it could alert the attendant. If certain devices or signals are permitted (Bluetooth headphones, etc.) and some are not permitted (cell phone communications, etc.), the MEDs could be attached to a central computer, that could ignore devices and device actions that are allowed, and only throw an alert for devices that are not permitted, by recognizing their signatures. This may require a plurality of MEDs to be installed on each plane, but they can be made rather cheaply and this MED system could be integrated into the already existing monitoring system that the planes uses.

The SED or NED can be used for automated self-driving vehicles. At each intersection there could be a directional RF emitter. These emitters can face oncoming traffic, and let's assume that the self-driving vehicle has a SED or NED mounted on it. As the vehicle approaches the intersection, the onboard SED or NED can monitor the directional RF emissions from the intersection. The RF emitter can produce simple codes representing traffic commands, such as RF signatures for "stop", "yield", and "go". Self-driving vehicles use many sensors to double check traffic signals. The SED or NED used in this example would add another check and improve the safety of self-driving vehicles. In addition, the SED or NED, with machine learning and artificial intelligence, can be the ultimate passive radar system, able to validate the location of people as the car drives, and able to perceive the active radar emissions from other vehicles, to locate them and monitor their speed. In addition, if a millimeter wave NED were used, material properties could be approximated. For example, metal could easily be identified by processing the energy signals, or even the visual representation of the energy signals in the environment. The NED passive radar system could help strengthen the vehicles object identification capabilities. This passive NED radar system could be attached to vehicles, aircraft, ships, submarines, or other machines or objects, in order to monitor the environment, locating and identifying emitters of interest. For example, a self-driving vehicle could use the SED or NED as an additional way to validate that an object under analysis is indeed a pedestrian. Suppose a self-driving vehicle has a camera system that operates in the visible range. It sees objects in the visible range and is fairly certain that the object is a person but is not entirely sure. Let's say that the object also looks like a dog slightly to the vehicle, in this situation. If the self-driving vehicle had a SED or NED attached, it could monitor the RF energy activity from that object's location, and if it detects a cell phone from that location, then it can use this information as additional validation that the object in question is more likely to be a human, than a dog. In addition, these machines can use the SED or NED to "see" in their environment that is being illuminated by ambient sources of RF energy, as described before.

A SED or NED with display system to see RF as described before could be used in construction applications, to detect wooden beams in walls for stud finding, and to see through walls. One could see metal pipes in walls, conduit, wires, metal beams etc. In order to illuminate wires in walls, or trace a connection, searching for the end of a broken wire or pipe for example, an RF injector unit could be connected to a wire, or metal pipe. The RF injector would effectively inject RF energy into the object, which would be conducted through the metal wire or pipe. As the RF energy travels, it illuminates the surrounding environment, until it reaches the end of its conductive path. If the user has a NED, he could walk around and see the wire or pipe through walls, and possibly find diagnose the issue. It might be possible to inject RF into pipes or wires that are laid underground, although this might not be practical. There are limits on the power levels of RF emissions. The RF injector although feasible might not be possible due to limits on RF power levels.

A medical imaging device could be made using the NED. It would certainly take a lot of work to develop this application to its full potential, but it is possible to make a NED imaging device for medical applications. For example, a patient could be asked to lay on a medical exam table. A flat NED antenna array designed to detect RF energy in the millimeter wave range for example, could be pressed to a patient's stomach, or the area to be imaged. A separate emitter could be pressed to another area of the patient, for example, slightly left of the area to be imaged. This emitter could consist of an antenna array having beam forming capabilities, so that the RF beam being emitted could be focused to different depth levels, depending on the depth of the area to be imaged. The NED could use holographic imaging techniques, to image various depth levels. In addition to seeing surfaces of objects within a person, such as a baby in a woman, imaging within these objects can be done using concepts of holography. With the freedom to move the source of illumination, such as an RF emitter in this case, the image can be performed deeper. For example, if the emitter was placed behind the patient, behind the area desired to be imaged, pressing the emitter to the patient so that much of the energy is transmitted into the patient can illuminate through the patient. This concept is familiar. In a dark room, a bright flashlight, such as the flashlight on a cell phone, shined at a person's finger from some distance above, can illuminate the surface of the person's hand. However, if this bright flashlight is placed behind the person's finger, right up against it, the light through the person's finger can be seen easily. It is, therefore, possible to image areas inside the patient using the NED, focusing at many depth levels, using concepts in analog and digital holography, and other signal processing, for example.

Additional tests can be performed to determine if thunderstorms, heartbeats, signals in the human brain, RF vortexes or tornados can be targeted to be analyzed with the SED or NED. If so, the SED or NED can benefit many more areas.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be desirable to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A monitoring system comprising:
an n-phonic energy detection ("NED") system comprising:
  two antenna structures separated by a distance, each of the two antenna structures comprising a plurality of antenna elements, wherein each of the plurality of antenna elements is a directional waveguide antenna, wherein each of the two antenna structures comprises an array of antenna elements arranged in close proximity relative to each other, and wherein the array of antenna elements forms a sphere;
  at least two radio frequency ("RF") detectors configured to detect RF energy that is emitted from a source and received by each of the two antenna structures; and
  an amplifier configured to amplify signals from the at least two RF detectors and output the amplified signals to a computer; and
an RF emitter configured to be attached to a person or to an object.

2. The monitoring system according to claim 1, wherein the RF emitter is configured to emit a unique RF energy signal.

3. The monitoring system according to claim 1, wherein the NED system is configured to be mounted periodically to set up a perimeter.

4. The monitoring system according to claim 1, wherein the NED system is configured to monitor an electronic device carried by the person.

5. The monitoring system according to claim 4, wherein the NED system is configured to use unique signatures from the electronic device to validate an identity of the person.

6. The monitoring system according to claim 5, wherein the unique signatures are obtained from at least one of software applications installed on the electronic device, unique device signature specific to a model of the electronic device, or individual biometric characteristics of the person.

7. The monitoring system according to claim 4, wherein the electronic device is one of a smart phone, a smart watch, a tablet, or a laptop.

8. The monitoring system according to claim 1, wherein the NED system is configured to be mounted on a wall of a building.

9. The monitoring system according to claim 1, wherein the NED system is configured to detect activity by electronic devices.

10. The monitoring system according to claim 9, wherein the NED system is configured to detect activity by cellular phones or by electronic devices configured to communicate via a short-range communications protocol.

11. The monitoring system according to claim 9, wherein when the NED system detects activity by the electronic devices, the monitoring system is configured to send an alert to monitoring personnel.

12. The monitoring system according to claim 11, wherein the alert is a silent alert.

13. The monitoring system according to claim 9, wherein when the NED system detects activity by the electronic devices, the monitoring system is configured to trigger an audible alarm or a visual alarm indication.

14. The monitoring system according to claim 1, wherein each of the plurality of antenna elements is arranged on an outer surface of a half-sphere support structure.

15. The monitoring system according to claim 1, wherein the directional waveguide antennas are shaped as a cavity comprising an RF absorbing material.

16. The monitoring system according to claim 1, wherein the directional waveguide antennas are shaped as a cavity with an interior of the cavity being coated with metallic conductive surfaces.

17. The monitoring system according to claim 1, wherein the array of antenna elements are arranged on an outer surface of the sphere.

18. A monitoring system comprising:
an n-phonic energy detection ("NED") system comprising:
  two antenna structures separated by a distance, each of the two antenna structures comprising a plurality of antenna elements, wherein each of the two antenna structures comprises an array of antenna elements arranged in close proximity relative to each other, and wherein the array of antenna elements forms a sphere;
  at least two radio frequency ("RF") detectors configured to detect RF energy that is emitted from a source and received by each of the two antenna structures;
  an amplifier configured to amplify signals from the at least two RF detectors and output the amplified signals to a computer; and
  an RF absorbing material applied on an outermost surface between at least two antenna elements of the plurality of antenna elements; and
an RF emitter configured to be attached to a person or to an object.

* * * * *